(12) United States Patent
Lee et al.

(10) Patent No.: US 8,467,681 B2
(45) Date of Patent: Jun. 18, 2013

(54) METHOD FOR CHARACTERIZING WAVELENGTH SWITCHED OPTICAL NETWORK SIGNAL CHARACTERISTICS AND NETWORK ELEMENT COMPATIBILITY CONSTRAINTS FOR GENERALIZED MULTI-PROTOCOL LABEL SWITCHING

(75) Inventors: Young Lee, Plano, TX (US); Greg Bernstein, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 404 days.

(21) Appl. No.: 12/898,778

(22) Filed: Oct. 6, 2010

(65) Prior Publication Data

US 2011/0081147 A1    Apr. 7, 2011

Related U.S. Application Data

(60) Provisional application No. 61/249,206, filed on Oct. 6, 2009, provisional application No. 61/252,982, filed on Oct. 19, 2009.

(51) Int. Cl.
    *H04J 14/00*    (2006.01)
(52) U.S. Cl.
    USPC .............. 398/48; 398/49; 398/45; 398/57; 398/69
(58) Field of Classification Search
    USPC .............. 398/45–48, 66, 19–28, 49, 57, 69
    See application file for complete search history.

(56) References Cited

U.S. PATENT DOCUMENTS

| 7,761,092 | B2 * | 7/2010 | Desch et al. | 455/422.1 |
|---|---|---|---|---|
| 8,208,405 | B2 * | 6/2012 | Lee et al. | 370/254 |
| 8,208,808 | B2 * | 6/2012 | Bernstein et al. | 398/48 |
| 8,249,451 | B2 * | 8/2012 | Lee et al. | 398/57 |
| 8,290,366 | B2 * | 10/2012 | Lee et al. | 398/57 |

(Continued)

FOREIGN PATENT DOCUMENTS

| CN | 101163090 A | 4/2008 |
|---|---|---|
| CN | 101621723 A | 1/2010 |

OTHER PUBLICATIONS

Lee, Y., et al., "Routing and Wavelength Assignment Information Model for Wavelength Switched Optical Networks," draft-ietf-ccamp-rwa-info-06.txt, Feb. 8, 2010, 15 pages.

(Continued)

*Primary Examiner* — Daniel Washburn
*Assistant Examiner* — Hibret Woldekidan
(74) *Attorney, Agent, or Firm* — Conley Rose, P.C.; Grant Rodolph; Brandt Howell

(57) ABSTRACT

An apparatus comprising a path computation element (PCE) configured to perform a path computation using signal compatibility constraints information for a network element (NE) in a wavelength switched optical network (WSON), wherein the signal constraints information are communicated at a Generalized Multi-Protocol Label Switching (GMPLS) control plane layer and comprise a plurality of signal attributes and a plurality of NE compatibility constraints. A network component comprising a transmitter unit configured to transmit signal compatibility constraints via GMPLS signaling, wherein the signal compatibility constraints define the signal compatibility constraints for a NE in a WSON. A method comprising receiving signal compatibility constraints for a NE in a WSON, performing a path calculation based on the signal compatibility constraints for the NE, and sending signal compatibility constraints associated with a computed path.

15 Claims, 9 Drawing Sheets

U.S. PATENT DOCUMENTS

| | | | |
|---|---|---|---|
| 2005/0080502 A1* | 4/2005 | Chernyak et al. | 700/97 |
| 2008/0225723 A1* | 9/2008 | Lee et al. | 370/235 |
| 2008/0298805 A1* | 12/2008 | Lee et al. | 398/48 |
| 2009/0110395 A1 | 4/2009 | Lee et al. | |
| 2009/0116836 A1* | 5/2009 | Bernstein et al. | 398/51 |
| 2010/0100959 A1* | 4/2010 | Mahaffey | 726/22 |
| 2010/0183308 A1* | 7/2010 | Gerstel et al. | 398/79 |
| 2011/0081147 A1 | 4/2011 | Lee et al. | |
| 2011/0199938 A1* | 8/2011 | Kompella | 370/254 |
| 2012/0148240 A1* | 6/2012 | Ceccarelli et al. | 398/45 |

OTHER PUBLICATIONS

Martinelli, G., Ed., et al., "GMPLS Signaling Extensions for Optical Impairment Aware Lightpath Setup," draft-martinelli-ccamp-optical-imp-signaling-01.txt, Feb. 22, 2008, 19 pages.

Zhang, F., et al., "OSPF Extensions in Support of Routing and Wavelength Assignment (RWA) in Wavelength Switched Optical Networks (WSONs)," draft-zhang-ccamp-rwa-wson-routing-ospf-02.txt, Oct. 22, 2009, 13 pages.

Foreign Communication From a Related Counterpart Application, European Application No. 11741912.7, Extended European Search Report dated Nov. 2, 2012, 10 pages.

ITU-T Recommendation G.652, "Characteristics of a Single-Mode Optical Fibre and Cable," Jun. 2005, 20 pages.

ITU-T Recommendation G.653, "Characteristics of a Dispersion-Shifted Single-Mode Optical Fibre and Cable," Dec. 2006, 20 pages.

TU-T Recommendation G.654, "Characteristics of a Cut-Off Shifted Single-Mode Optical Fibre and Cable," Dec. 2006, 20 pages.

ITU-T Recommendation G.655, "Characteristics of a Non-Zero Dispersion-Shifted Single-Mode Optical Fibre and Cable," Mar. 2006, 23 pages.

ITU-T Recommendation G.656, "Characteristics of a Fibre and Cable With Non-Zero Dispersion for Wideband Optical Transport," Dec. 2006, 18 pages.

ITU-T Recommendation G.694 1 "Spectral Grids for WDM Applications: DWDM Frequency Grid," Jun. 2002, 11 pages.

TU-T Recommendation G.694.2, "Spectral Grids for WDM Applications: CWDM Wavelength Grid," Dec. 2003, 10 pages.

ITU-T Recommendation G.698 1 "Multichannel DWDM Applications with Single-Channel Optical Interfaces," Nov. 2009, 34 pages.

ITU-T Recommendation G.698.2, "Amplified Multichannel Dense Wavelength Division Multiplexing Applications with Single Channel Optical Interfaces," Nov. 2009, 38 pages.

ITU-T Recommendation G.709/Y.1331, "Interfaces for the Optical Transport Network (OTN)," Mar. 2003, 118 pages.

ITU-T Recommendation G.707/Y.1322, "Network Node Interface for the Synchronous Digital Hierarchy (SDH)," Jan. 2007, 196 pages.

ITU-T Recommendation G.975.1, "Forward Error Correction for High Bit-Rate DWDM Submarine Systems," Feb. 2004, 58 pages.

Bernstein, G., et al., "Framework for GMPLS and PCE Control of Wavelength Switched Optical Networks (WSON)," draft-ietf-ccamp-wavelength-switched-framework-00.txt, May 13, 2008.

Bernstein, G., et al., "Framework for GMPLS and PCE Control of Wavelength Switched Optical Networks (WSON)," draft-ietf-ccamp-wavelength-switched-framework-01.txt, Oct. 31, 2008.

Bernstein, G., et al., "Modeling WDM Wavelength Systems for Use in Automated Path Computation," Journal of Optical Communications and Networking, vol. 1, Jun. 2009, pp. 187-195.

Bernstein, G., et al., "General Network Element Constraint Encoding for GMPLS Controlled Networks," draft-ietf-ccamp-general-constraint-encode-00.txt, Feb. 18, 2010.

Farrel, A., et al., "Encoding of Attributes for MPLS LSP Establishment Using Resource Reservation Protocol Traffic Engineering (RSVP-TE)," RFC 5420, Feb. 2009.

Lee, Y., et al., "Routing and Wavelength Assignment Information Model for Wavelength Switched Optical Networks," draft-ietf-ccamp-rwa-info-02.txt, Mar. 3, 2009.

Foreign Communication from a Related Counterpart Application-International Search Report, PCT/CN2011/070927, May 19, 2011, 7 pages.

Foreign Communication from a Related Counterpart Application-Written Opinion PCT/CN2011/070927, May 19, 2011, 6 pages.

McCloghire, K., et al., "Structure of Management Information Version 2 (SMIv2)," RFC 2578, Apr. 1999.

McCloghire, K., et al., "The Interfaces Group MIB," RFC 2863, Jun. 2000.

Bradner, S., "Key Words for Use in RFCs to Indicate Requirement Levels," RFC 2119, Mar. 1997.

Berger, L., "Generalized Multi-Protocol Label Switching (GMPLS) Signaling Functional Description," RFC 3471, Jan. 2003.

Berger, L., "Generalized Multi-Protocol Label Switching (GMPLS) Signaling Resource Reservation Protocol-Traffic Engineering (RSVP-TE) Extensions," RFC 3473, Jan. 2003.

Farrel, A., et al., "A Path Computation Element (PCE) Based Architecture," RFC 4655, Aug. 2006.

Ash, J., et al., "Path Computation Element (PCE) Communication Protocol Generic Requirements," RFC 4657, Sep. 2006.

Vasseur, J.P., et al., "Path Computation Element (PCE) Communication Protocol (PCEP)," RFC 5440, Mar. 2009.

Lee, Y., et al., "OSPF Enhancement for Signal and Network Element Compatibility for Wavelength Switched Optical Networks," draft-lee-ccamp-wson-signal-compatibility-ospf-00.txt, Oct. 12, 2009.

Lee, Y., et al., "A Framework for the Control of Wavelength Switched Optical Networks (WSON) with Impairments," draft-ietf-ccamp-wson-impairments-00.txt, Jun. 29, 2009.

Lee, Y., et al., "A Framework for the Control of Wavelength Switched Optical Networks (WSON) with Impairments," draft-ietf-ccamp-wson-impairments-01.txt, Oct. 22, 2009.

Lee, Y., et al., "A Framework for the Control of Wavelength Switched Optical Networks (WSON) with Impairments," draft-ietf-ccamp-wson-impairments-02.txt, May 20, 2010.

Lee, Y., et al., "A Framework for the Control of Wavelength Switched Optical Networks (WSON) with Impairments," draft-ietf-ccamp-wson-impairments-03.txt, Jul. 9, 2010.

Lee, Y., et al., "Framework for GMPLS and PCE Control of Wavelength Switched Optical Networks (WSON)," draft-ietf-ccamp-rwa-wson-framework-00.txt, Dec. 5, 2008.

Lee, Y., et al., "Framework for GMPLS and PCE Control of Wavelength Switched Optical Networks (WSON)," draft-ietf-ccamp-rwa-wson-framework-01.txt, Feb. 9, 2009.

Lee, Y., et al., "Framwork for GMPLS and PCE Control of Wavelength Switched Optical Networks (WSON)," draft-ietf-ccamp-rwa-wson-framework-02.txt, Mar. 4, 2009.

Lee, Y., et al., "Framework for GMPLS and PCE Control of Wavelength Switched Optical Networks (WSON)," draft-ietf-ccamp-rwa-wson-framework-03.txt, Sep. 8, 2009.

Lee, Y., et al., "Framework for GMPLS and PCE Control of Wavelength Switched Optical Networks (WSON)," draft-ietf-ccamp-rwa-wson-framework-04.txt, Oct. 9, 2009.

Lee, Y., et al., "Framework for GMPLS and PCE Control of Wavelength Switched Optical Networks (WSON)," draft-ietf-ccamp-rwa-wson-framework-05.txt, Feb. 1, 2010.

Lee, Y., et al., "Framework for GMPLS and PCE Control of Wavelength Switched Optical Networks (WSON)," draft-ietf-ccamp-rwa-wson-framework-06.txt, Apr. 5, 2010.

Le Roux, J.L., et al., "OSPF Protocol Extensions for Path Computation Element (PCE) Discovery," RFC 5088, Jan. 2008.

Le Roux, J.L., et al., "IS-IS Protocol Extensions for Path Computation Element (PCE) Discovery," RFC 5089, Jan. 2008.

Series G: Transmission Systems and Media, Digital Systems and Networks, Transmission Media Characteristics—Characteristics of Optical Components and Subsystems, Spectral Grids for WDM Applications: DWDM Frequency Grid, ITU-T G.694.1, Jun. 2002, 11 pages.

Kompella, K., et al., "Routing Extensions in Support of Generalized Multi-Protocol Label Switching (GMPLS)," RFC 4202, Oct. 2005.

Kompella, K., et al., "OSPF Extensions in Support of Generalized Multi-Protocol Label Switching (GMPLS)," RFC 4203, Oct. 2005.

Papadimitriou, D., "Generalized Multi-Protocol Label Switching (GMPLS) Signaling Extensions for G.709 Optical Transport Networks Control," RFC 4328, Jan. 2006.

Kompella, K., et al., "IS-IS Extensions in Support of Generalized Multi-Protocol Label Switching (GMPLS)," RFC 5307, Oct. 2008.

Shiomoto, K., et al., "Requirements for GMPLS-Based Multi-Region and Multi-Layer Networks (MRN/MLN)," RFC 5212, Jul. 2008.
Bernstein, Greg, et al., "Routing and Wavelength Assignment Information for Wavelength Switched Optical Networks," draft-bernstein-ccamp-wson-info-00.txt, Oct. 30, 2007.
Bernstein, Greg, et al., "Routing and Wavelength Assignment Information for Wavelength Switched Optical Networks," draft-bernstein-ccamp-wson-info-01.txt, Nov. 19, 2007.
Bernstein, Greg, et al., "Routing and Wavelength Assignment Information for Wavelength Switched Optical Networks," draft-bernstein-ccamp-wson-info-02.txt, Feb. 20, 2008.
Bernstein, Greg, et al., "Routing and Wavelength Assignment Information for Wavelength Switched Optical Networks," draft-bernstein-ccamp-wson-info-03.txt, Jul. 7, 2008.
Bernstein, G., et al., "Routing and Wavelength Assignment Information Encoding for Wavelength Switched Optical Networks," draft-ietf-ccamp-rwa-wson-encode-00.txt, Dec. 18, 2008.
Bernstein, G., et al., "Routing and Wavelength Assignment Information Encoding for Wavelength Switched Optical Networks," draft-ietf-ccamp-rwa-wson-encode-01.txt, Mar. 3, 2009.
Bernstein, G., et al., "Routing and Wavelength Assignment Information Encoding for Wavelength Switched Optical Networks," draft-ietf-ccamp-rwa-wson-encode-02.txt, Jul. 10, 2009.
Bernstein, G., et al., "Routing and Wavelength Assignment Information Encoding for Wavelength Switched Optical Networks," draft-ietf-ccamp-rwa-wson-encode-03.txt, Oct. 8, 2009.
Bernstein, G., et al., "Routing and Wavelength Assignment Information Encoding for Wavelength Switched Optical Networks," draft-ietf-ccamp-rwa-wson-encode-04.txt, Feb. 18, 2010.
Bernstein, G., et al., "Routing and Wavelength Assignment Information Encoding for Wavelength Switched Optical Networks," draft-ietf-ccamp-rwa-wson-encode-05.txt, Jul. 12, 2010.
Otani, Tomohiro, et al., "Generalized Labels for G.694 Lambda-Switching Capable Label Switching Routers," draft-ietf-ccamp-gmpls-g-694-lambda-labels-00.txt, May 27, 2008.
Otani, Tomohiro, et al., "Generalized Labels for G.694 Lambda-Switching Capable Label Switching Routers," draft-ietf-ccamp-gmpls-g-694-lambda-labels-02.txt, Jul. 14, 2008.
Otani, Tomohiro, et al., "Generalized Labels for G.694 Lambda-Switching Capable Label Switching Routers," draft-ietf-ccamp-gmpls-g-694-lambda-labels-03.txt, Jan. 13, 2009.
Otani, Tomohiro, et al., "Generalized Labels for G.694 Lambda-Switching Capable Label Switching Routers," draft-ietf-ccamp-gmpls-g-694-lambda-labels-04.txt, Mar. 23, 2009.
Otani, Tomohiro, et al., "Generalized Labels for G.694 Lambda-Switching Capable Label Switching Routers," draft-ietf-ccamp-gmpls-g-694-lambda-labels-05.txt, Dec. 7, 2009.
Otani, Tomohiro, et al., "Generalized Labels for G.694 Lambda-Switching Capable Label Switching Routers," draft-ietf-ccamp-gmpls-g-694-lambda-labels-06.txt, Mar. 19, 2010.
Otani, Tomohiro, et al., "Generalized Labels for G.694 Lambda-Switching Capable Label Switching Routers," draft-ietf-ccamp-gmpls-g-694-lambda-labels-07.txt, Apr. 8, 2010.
Series G: Transmission Systems and Media, Digital Systems and Networks, Digital Networks—Optical Transport Networks, Architecture of Optical Transport Networks, ITUT G.872, Nov. 2001, 72 pages.
Series G: Transmission Systems and Media, Digital Systems and Networks, Digital Sections and Digital Line System—Digital Line Systems, Optical Transport Network Physical Layer, ITU-T G.959.1, Mar. 2006, 57 pages.
Sambo, N., et al., "GMPLS-Controlled Dynamic Translucent Optical Networks," IEEE Network, May/Jun. 2009, pp. 34-40.
Sen, A., et al., "On Sparse Placement of Regenerator Nodes in Translucent Optical Networks," IEEE Globecom, 2008, pp. 1-6.
Shen, Gangxiang, et al., "Translucent Optical Networks: The Way Forward," Topics in Optical Communications, IEEE Communications Magazine, Feb. 2007, pp. 48-54.
Yang, Xi, "Dynamic Routing in Translucent WDM Optical Networks: The Intradomain Case," Journal of Lightwave Technology, vol. 23, Mar. 2005, pp. 955-971.

Otani, Tomohiro, et al., "Generalized Labels for G.694 Lambda-Switching Capable Label Switching Routers," draft-ietf-ccamp-gmpls-g-694-lambda-labels-01.txt, May 27, 2008.
Bernstein, G., et al., "WSON Signal Characteristics and Network Element Compatibility Constraints for GMPLS," Network Working Group, Internet Draft, draft-bernstein-ccamp-wson-compatibility-00.txt, Aug. 17, 2009, 30 pages.
Bernstein, G., et al., "WSON Signal Characteristics and Network Element Compatibility Constraints for GMPLS," Network Working Group, Internet Draft, draft-bernstein-ccamp-wson-compatibility-01.txt, Oct. 7, 2009, 23 pages.
Fang, L., Ed., "Security Framework for MPLS and GMPLS Networks," Network Working Group, Internet Draft, draft-ieft-mpls-mpls-and-gmpls-security-framework-09.txt, Mar. 8, 2010, 64 pages.
Imajuku, W., et al., "Routing Extensions to Support Network Elements with Switching Constraint," CCAMP Working Group, Internet Draft, draft-imajuku-ccamp-rtg-switching-constraint-02.txt, Jul. 2007, 8 pages.
Lee, Y., et al., "Path Computation Element Communication Protocol (PCEP) Requirements and Extensions for the Support of Wavelength Switched Optical Networks," Network Working Group, Internet Draft, draft-lee-pce-wson-routing-wavelength-00.txt, Oct. 29, 2007, 21 pages.
Lee, Y., et al., "PCEP Requirements and Extensions for WSON Routing and Wavelength Assignment," Network Working Group, Internet Draft, draft-lee-pce-wson-routing-wavelength-02.txt, Jun. 27, 2008, 17 pages.
Otani, T., et al., "Generalized Labels of Lambda-Switching Capable Label Switching Routers (LSR)," Internet Draft, draft-otani-ccamp-gmpls-lambda-labels-02.txt, Feb. 24, 2008, 11 pages.
"Series G: Transmission Systems and Media, Digital Systems and Networks, Transmission Media Characteristics—Characteristics of Optical Components and Subsystems, Transmission Characteristics of Optical Components and Subsystems," ITU-T G.671, Jan. 2005, 42 pages.
"Series G: Transmission Systems and Media, Digital Systems and Networks, Digital Networks—Optical Transport Networks, Architecture of Optical Transport Networks," ITU-T G.872, Nov. 2001, 72 pages.
"Series G: Transmission Systems and Media, Digital Systems and Networks, Optical System Design and Engineering Considerations," ITU-T Series G Supplement 39, Dec. 2008, 106 pages.
"Series G: Transmission Systems and Media, Digital Systems and Networks, Transport of IEEE 10G Base-R in Optical Transport Networks (OTN)," ITU-T Series G Supplement 43, Nov. 2006, 18 pages.
Winzer, P., et al., "Advanced Optical Modulation Formats," Proceedings of the IEEE, vol. 94, No. 5, May 2006, pp. 952-985.
Zang, H., et al., "A Review of Routing and Wavelength Assignment Approaches for Wavelength-Routed Optical WDM Networks," Optical Networks Magazine, Jan. 2000, pp. 47-60.
Katz, D., et al., "Traffic Engineering (TE) Extensions to OSPF Version 2," Network Working Group, RFC 3630, Sep. 2003, 14 pages.
Mannie, E., Ed., "Generalized Multi-Protocol Label Switching (GMPLS) Architecture," Network Working Group, RFC 3945, Oct. 2004, 69 pages.
Strand, J., Ed., et al., "Impairments and Other Constraints on Optical Layer Routing," Network Working Group, RFC 4054, May 2005, 28 pages.
Kompella, K., et al., "Link Bundling in MPLS Traffic Engineering (TE)," Network Working Group, RFC 4201, Oct. 2005, 12 pages.
Mannie, E., et al., "Generalized Multi-Protocol Label Switching (GMPLS) Extensions for Synchronous Optical Network (SONET) and Synchronous Digital Hierarchy (SDH) Control," Network Working Group, RFC 4606, Aug. 2006, 24 pages.
Vasseur, JP., Ed., "A Backward-Recursive PCE-Based Computation (BRPC) Procedure to Compute Shortest Constrained Inter-Domain Traffic Engineering Label Switched Paths," Network Working Group, RFC 5441, Apr. 2009, 19 pages.
Leroux, JL., et al., "Encoding of Objective Functions in the Path Computation Element Communication Protocol (PCEP)," Network Working Group, RFC 5541, Jun. 2009, 23 pages.

Lee, Y., et al., "Path Computation Element Communication Protocol (PCEP) Requirements and Protocol Extensions in Support of Global Concurrent Optimization," Network Working Group, RFC 5557, Jul. 2009, 27 pages.

Fang, L., Ed., "Security Framework for MPLS and GMPLS Networks," Internet Engineering Task Force (IETF), RFC 5920, Jul. 2010, 66 pages.

Ozdaglar, A., et al., "Routing and Wavelength Assignment in Optical Networks," IEEE/ACM Transactions on Networking, vol. 11, Issue 2, Apr. 2003, pp. 259-272.

Coldren, L., et al., "Tunable Semiconductor Lasers: A Tutorial," Journal of Lightwave Technology, vol. 22, No. 1, Jan. 2004, pp. 193-202.

Chu, X., et al., "Wavelength Converter Placement Under Different RWA Algorithms in Wavelength-Routed All-Optical Networks," IEEE Transactions on Communications, vol. 51, No. 4, Apr. 2003, pp. 607-617.

Basch, E., et al., "Architectural Tradeoffs for Reconfigurable Dense Wavelength-Division Multiplexing Systems," IEEE Journal of Selected Topics in Quantum Electronics, vol. 12, No. 4, Jul./Aug. 2006, pp. 615-626.

Buus, J., et al., "Tunable Lasers in Optical Networks," Journal of Lightwave Technology, vol. 24, No. 1, Jan. 2006, pp. 5-11.

Foreign Communication From a Related Counterpart Application, European Application No. 11741912.7, Extended European Search Report dated Dec. 10, 2012, 9 pages.

Lee, Y., et al., "Routing and Wavelength Assignment Information Model for Wavelength Switched Optical Networks," Network Working Group, Internet Draft, draft-ietf-ccamp-rwa-info-04.txt, Sep. 9, 2009, 20 pages.

Lee, Y., et al., "Routing and Wavelength Assignment Information Model for Wavelength Switched Optical Networks," Network Working Group, Internet Draft, draft-ietf-ccamp-rwa-info-09.txt, Sep. 3, 2010, 52 pages.

Kompella, K, Ed., et al., "Intermediate System to Intermediate System (IS-IS) Extensions in Support of Generalized Multi-Protocol Label Switching (GMPLS)," Network Working Group, RFC 4205, Oct. 2005, 12 pages.

"Series G: Transmission Systems and Media, Digital Systems and Networks, Digital Sections and Line System—Digital Line Systems, Optical Transport Network Physical Layer Interfaces," ITU-T G.959.1, Mar. 2008, 72 pages.

"Series G: Transmission Systems and Media, Digital Systems and Networks, Digital Sections and Line System—Digital Line Systems, Optical Transport Network Physical Layer Interfaces," ITU-T G.959.1, Nov. 2009, 74 pages.

* cited by examiner

METHOD FOR CHARACTERIZING WAVELENGTH SWITCHED OPTICAL NETWORK SIGNAL CHARACTERISTICS AND NETWORK ELEMENT COMPATIBILITY CONSTRAINTS FOR GENERALIZED MULTI-PROTOCOL LABEL SWITCHING

CROSS-REFERENCE TO RELATED APPLICATIONS

The present application claims priority to U.S. Provisional Patent Application No. 61/249,206 filed Oct. 6, 2009 by Young Lee et al. and entitled "Method for Characterizing WSON Signal Characteristics and Network Element Compatibility Constraints for GMPLS," and U.S. Provisional Patent Application No. 61/252,982 filed Oct. 19, 2009 by Young Lee et al. and entitled "Method for Path Computation Element Communication Protocol (PCEP) to Support Signal Compatibility and Processing Constraints," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bi-directional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks. One of the challenges in implementing WSONs is the determination of the routing and wavelength assignment (RWA) for the various signals that are being transported through the network at any given time. To implement RWA, various NE related information can be forwarded from a Path Computation Client (PCC), such as a NE, and received and processed at a Path Computation Element (PCE).

SUMMARY

In one embodiment, the disclosure includes an apparatus comprising a PCE configured to perform a path computation using signal compatibility constraints information for a NE in a WSON, wherein the signal constraints information are communicated at a Generalized Multi-Protocol Label Switching (GMPLS) control plane layer and comprise a plurality of signal attributes and a plurality of NE compatibility constraints.

In another embodiment, the disclosure includes a network component comprising a transmitter unit configured to transmit signal compatibility constraints via GMPLS signaling, wherein the signal compatibility constraints define the signal compatibility constraints for a NE in a WSON.

In yet another embodiment, the disclosure includes a method comprising receiving signal compatibility constraints for a NE in a WSON, performing a path calculation based on the signal compatibility constraints for the NE, and sending signal compatibility constraints associated with a computed path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any quantity of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

GMPLS for WSON may support a plurality of types of wavelength switching systems. However, for some transparent or multi-wavelength optical systems and hybrid electro-optical systems, the GMPLS control plane may be restricted to processing WSON signals with specific characteristics or attributes. The hybrid electro-optical systems may include optical-electrical-optical (OEO) switches, regenerators, and/or wavelength converters. For example, the WSON may comprise a limited quantity of NEs that may be configured to process one compatible class of signals. Such a scenario may limit the WSON flexibility and prevent the efficient use of some NEs, such as regenerators, OEO switches, and wavelength converters. In some cases, the processing capability of some NEs may not be directly supported or used during signal routing. For example, performing a regeneration function on a signal may require provisioning during the optical path establishment process.

Disclosed herein is a system and method for extending the GMPLS control plane to allow different signal types in WSONs or WDM networks based on compatibility constraints. The GMPLS control plane may be extended by providing WSON signal definition and attributes characterization. The system and method may also describe the NE compatibility constraints for a set of NEs, such as hybrid electro-optical or regenerator systems. The compatibility constraints, including signal characterization and the NE compatibility constraints, may be used to provide enhanced provisioning support in the network and enable GMPLS routing and signaling for the NEs. The compatibility constraints may also be used to enable a PCE to compute optical lightpaths according to signal compatibility constraints. Also disclosed is method that enables signal compatibility and processing constraints in PCE protocol (PCEP) for WSONs. Accordingly, a PCE may provide path computation based on the compatibility constraints, which may allow a plurality of NEs to process signals with specific characteristics and attributes.

Figure 1:
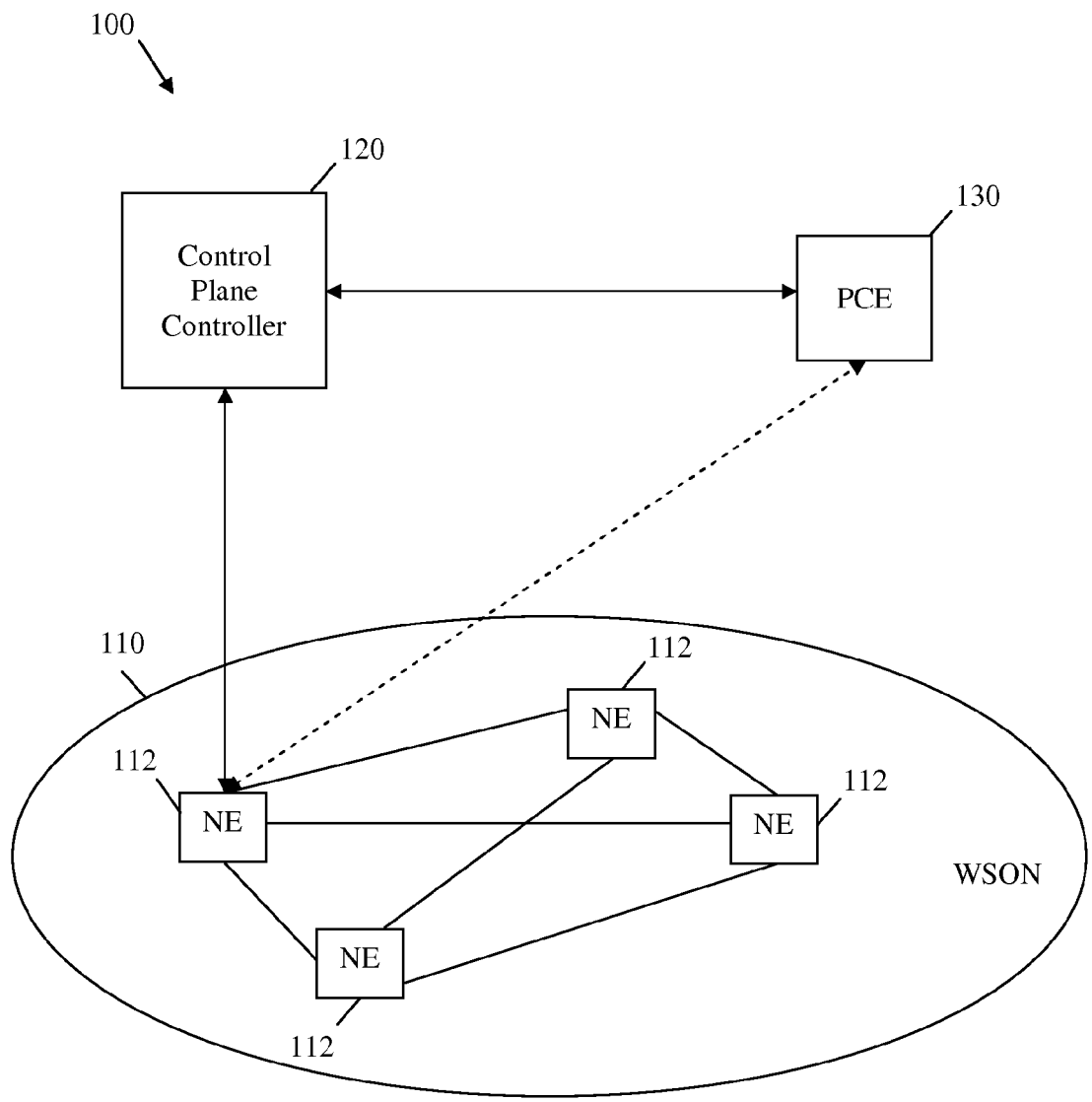
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may be any optical network that uses active or passive components to transport optical signals. For instance, the WSON 110 may be part of a long haul network, a metropolitan network, or a residential access network. The WSON 110 may implement WDM to transport the optical signals through the WSON 110, and may comprise various optical components including a plurality of NEs 112, which may be coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any quantity of NEs 112.

The NEs 112, also referred to as nodes, may be any devices or components that transport signals through the WSON 110. In an embodiment, the NEs 112 may consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters, as such may reduce the cost and complexity of the WSON 110. In specific embodiments, the NEs 112 may comprise optical switches such as optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

Some NEs 112 may be used for wavelength-based switching by forwarding, adding, or dropping any or all of the wavelengths that are used to transmit the optical signals. For instance, the NE 112 may comprise a plurality of ingress ports, such as line side ingress ports or add ports, a plurality of egress ports, such as line side egress ports or drop ports, or combinations thereof. The add ports and drop ports may also be called tributary ports. The optical signals handled by these various ports may comprise one or a plurality of optical wavelengths. The line side ingress ports may receive the optical signals and send some or all of the optical signals to the line side egress ports, which may in turn transmit the optical signals. Alternatively, the line side ingress ports may redirect some or all of the optical signals to the drop ports, which may drop the optical signals, for example, by transmitting the optical signals outside the optical fibers. The add ports may receive additional optical signals and send the optical signals to some of the line side egress ports, which may in turn transmit the optical signals.

In some instances, the NE 112 may comprise at least one colored port that may be an ingress port or an egress port, which may receive or transmit, respectively, the optical signal at a fixed optical wavelength or a limited range of optical wavelengths, e.g. less then a full range of wavelengths as defined by a standard, such as the course WDM (CWDM) or dense WDM (DWDM) standards, which are discussed below. Additionally or alternatively, the NE may comprise at least one colorless port that may be an ingress port or an egress port, which may receive or transmit, respectively, the optical signal at any one of a plurality of different wavelengths, e.g. a full range of wavelengths as defined by a standard, such as CWDM or DWDM. The NE 112 that comprises a colorless port and supports any or a plurality of variable wavelengths may be referred to as a colorless NE. Alternatively, the NE 112 that does not comprise a colorless port and supports one or a plurality of predetermined (or specified) wavelengths may be referred to as a colored NE. Further, the NE 112 may comprise one or a plurality of wavelength converters (WCs) that may convert one or a plurality of wavelengths between at least one ingress port and one egress port. For instance, a WC may be positioned between an ingress port and an egress port and may be configured to convert a first wavelength received at the ingress port into a second wavelength, which may then be transmitted at the egress port. The WC may comprise any quantity of optical and/or electrical components that may be configured for wavelength conversion, such as an OEO converter and/or a laser.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in International Telecommunication Union (ITU) Telecommunication Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as CWDM signals as defined in ITU-T G.694.2 or DWDM signals as defined in ITU-T G.694.1. All of the standards described in this disclosure are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as Generalized Multi-Protocol Label Switching (GMPLS), thereby coordinating the NEs 112 such that data signals are routed through the WSON 110 with little or no contention. In addition, the control plane controller 120 may communicate with the PCE 130 using PCEP to provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive wavelength and/or other information that may be used for the RWA from the control plane controller 120, from the WSON 110, or both. The wavelength information may comprise port wavelength restrictions for the NE 112, such as for a colored NE that comprises a colored port. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA data may include at least one route for each incoming signal and at least one wavelength associated with each route. The PCE 130 may then send all or part of the RWA data to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a PCC. The PCC may be any client application requesting a path computation to be performed by the PCE 130. The PCC may also be any network component that makes such a request, such as the control plane controller 120, or any NE 112, such as a ROADM or a FOADM.

Figure 2:
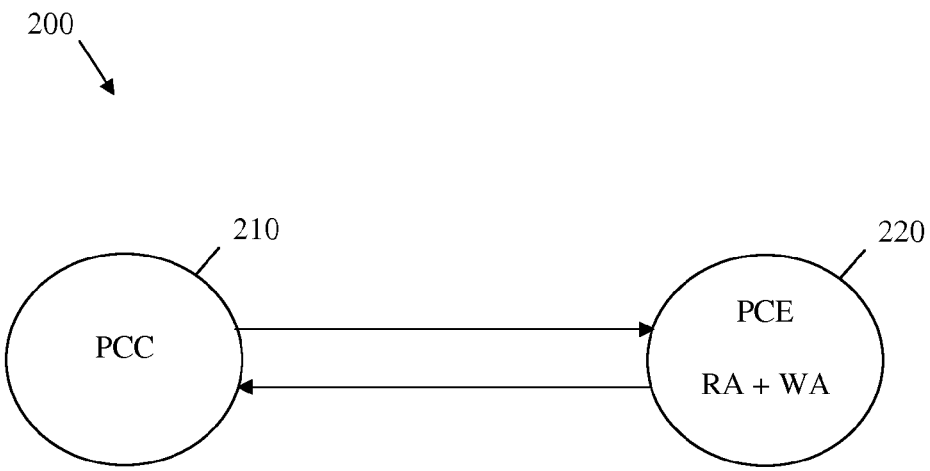
FIG. 2 is a schematic diagram of an embodiment of a combined RWA architecture.

FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information regarding the NEs and the network topology is provided. The combined RWA architecture 200 may be preferable for network optimization, smaller WSONs, or both.

Figure 3:
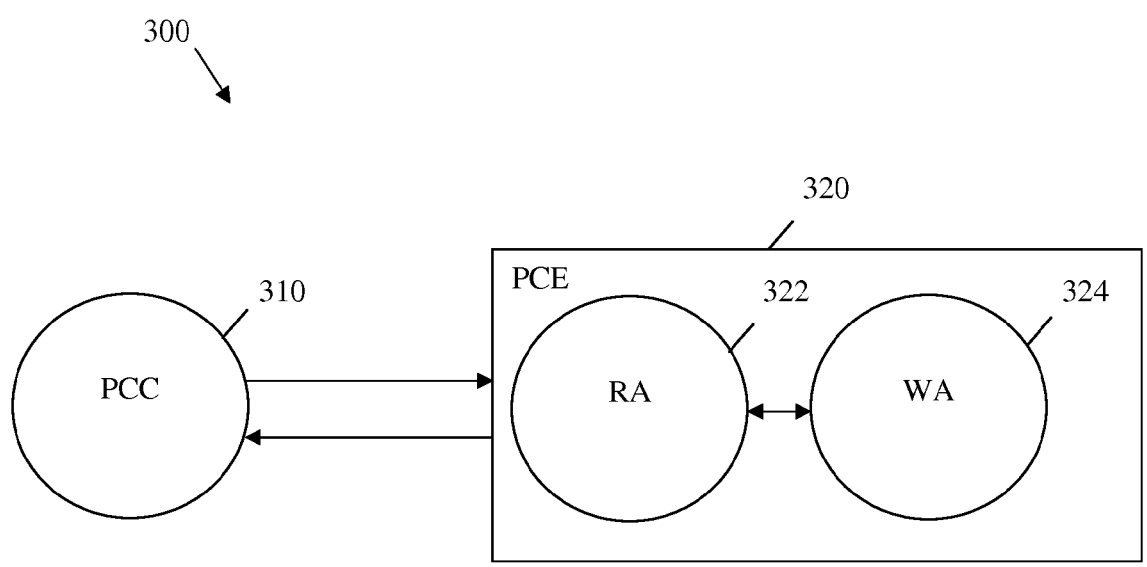
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
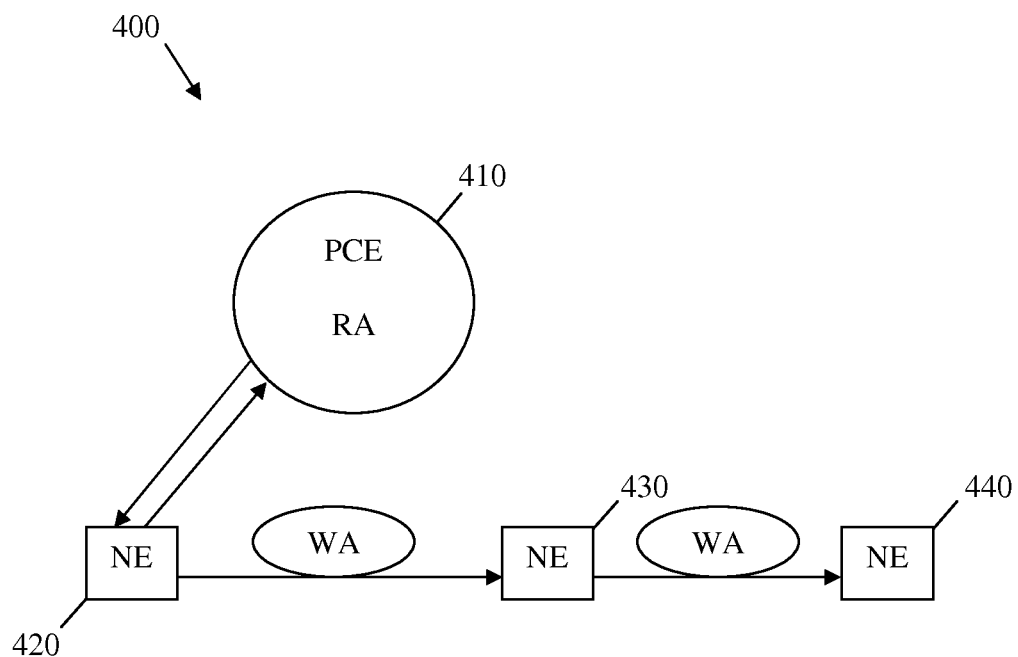
FIG. 4 is a schematic diagram of an embodiment of a distributed wavelength assignment architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
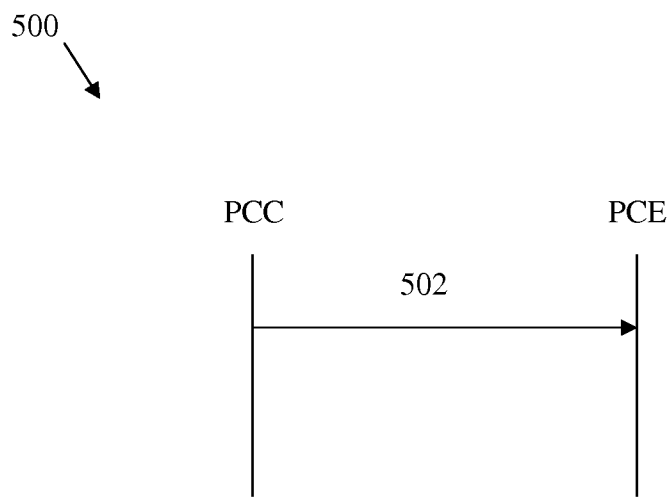
FIG. 5 is a protocol diagram of an embodiment of a PCC and PCE communication method.

FIG. 5 illustrates an embodiment of a communication method 500 between the PCC and the PCE. In the method 500, the PCC sends a message 502 to the PCE, where the message 502 comprises at least some of the RWA information described below. The message 502 may also contain a status indicator that indicates whether the RWA information is static or dynamic. In an embodiment, the status indicator may indicate how long the static or dynamic status lasts so that the PCE can know how long the RWA information is valid and/or when to expect an update. Additionally or alternatively, the message 502 may contain a type indicator that indicates whether the RWA information is associated with a node that may comprise a NE, a link, such as a WDM link, or both. In some instances, an acknowledgement message that confirms receipt of the message 502 may be sent from the PCE to the PCC, e.g. subsequent to receipt of the message 502.

The method 500 may be implemented using any suitable protocol, such as the IGP. The IGP may be a routing protocol used for exchanging route information among gateways, such as a host computer or routers, in an autonomous network. Internet networks can be divided into multiple domains or multiple autonomous systems, where one domain congregates a batch of host computers and routers that employ the same routing protocol. In such a case, the IGP may be provided for selecting routes in a domain. The IGP may be link-state routing protocol in that each node possesses information regarding the complete network topology. In such a case, each node can independently calculate the best next hop from it for every possible destination in the network using local information of the topology. The collection of best next hops may form the routing table for the node. In a link-state protocol, the only information that may be passed between the nodes is information used to construct the connectivity maps. Examples of suitable IGPs include GMPLS, open shortest path first (OSPF), and intermediate system to intermediate system (IS-IS).

As mentioned above, the message 502 may comprise RWA information that may be exchanged between the PCC and the PCE. The RWA information may also be exchanged, e.g. via signaling, between any of the NEs and/or between the NEs and the PCE. In an embodiment, the exchanged RWA information may comprise information about WSON signal definition or characterization, for example a plurality signal attributes. The RWA information may also comprise a plurality of NE compatibility constraints. For instance, some of the NEs in the WSON may have constraints on the types of signals that may be supported. The compatibility constraints, including the signal attributes and the NE compatibility constraints, may be used to determine the different signals that may be processed by the different NEs, such as for path computation purposes.

Some switching systems at the NEs may process multiple wavelengths at a time. However, the individual ports, transmitters, and/or receivers in the NEs may transmit/receive single wavelengths at a time, which may represent single channel interfaces. For instance, an NE may comprise an optical switch with multiple ports that each transmits/receives a single wavelength at a time, and thus corresponds to a single channel interface. The WSONs may include DWDM networks based on single channel interfaces, such as defined in ITU-T recommendations G.698.1 and G.698.2, both of which are incorporated herein by reference. G.698.1 and G.698.2 also define non-impairment related parameters including: (a) minimum channel spacing in Gigahertz (GHz); (b) bit rate/line coding (modulation) of tributary signals; and (c) minimum and maximum central frequency. The minimum channel spacing and the minimum and maximum central frequency may be related to link properties and are modeled in Internet Engineering Task Force (IETF) documents draft-ietf-ccamp-gmpls-g-694-lambda-labels-04.txt, draft-bernstein-ccamp-wson-g-info-03.txt, and draft-ietf-ccamp-rwa-wson-framework-06.txt (collectively hereinafter, WSON framework), all of which are incorporated herein by reference. Bit rate/line coding or modulation of tributary signals may be related to signal properties that are exchanged between the NEs.

The single channel interfaces are also described in ITU-T specifications G.698.1, G.698.2, and G.959.1, also incorporated herein by reference. G.698.1, G.698.2, and G.959.1 define a concept of an "optical tributary signal" as a single channel signal that is placed within an optical channel for transport across the optical network. The use of the term "tributary" specifies a single channel entity instead of a multi-channel optical signal. There is a plurality of defined types of optical tributary signals, known as "optical tributary signal classes." The optical tributary signals are each characterized in G.959.1 by a modulation format and bit rate range and include: (a) optical tributary signal class non-return-to-zero modulation (NRZ) 1.25 GHz (G); (b) optical tributary signal class NRZ 2.5G; (c) optical tributary signal class NRZ 10G; (d) optical tributary signal class NRZ 40G; and (e) optical tributary signal class return-to-zero modulation (RZ) 40G. Further, G.698.2 requires specifying the bit rate of the optical tributary signal. With further advances in technology, more optical tributary signal classes may be added to the standards. For example, a plurality of non-standardized advanced modulation formats are deployed at the 40G rate, including Different Phase Shift Keying (DPSK) and Phase Shaped Binary Transmission (PSBT).

An optical tributary signal may be assigned to an optical communication channel, e.g. for a link or NE in the WSON. The optical tributary signal may correspond to a label switched path (LSP) in GMPLS. The assigned WSON signal may have a plurality of characteristics or attributes including: (1) optical tributary signal class or modulation format; (2) FEC, such as whether FEC is used in the digital stream and what type of FEC is used; (3) center frequency or wavelength; (4) bit rate; and (5) GPID for the information format. Such signal characteristics or attributes may be needed to implement path selection and/or RWA implementation, e.g. to choose a compatible path. Accordingly, the WSON signal attributes or characteristics may be part of the RWA information exchanged between a PCC, a PCE, and/or a NE, such using IGP or GMPLS. For example, the WSON signal attributes or characteristics may be exchanged in the message 502.

The optical tributary signal class, FEC, and center frequency may vary as the signal traverses the network and is processed or converted by generators, OEO switches, and/or wavelength converters. The wavelength conversion may be supported in GMPLS. The bit rate and GPID may not change since they both describe the encoded bit stream. A set of GPID values may be defined for lambda or wavelength switching, such as described in IETF Request for Comments (RFC) 3471 and RFC 4328, both of which are incorporated herein by reference. Further, there may be a plurality of "pre-standard" or proprietary modulation formats and FEC codes used in WSONs. The presence of FEC in a signal may also be detected for some bit streams, such as described in ITU-T G.707, which is incorporated herein by reference. The presence of FEC in the signal may be indicated by a FEC status indication (FSI) byte in the signal or according to ITU-T G.709, which is incorporated herein by reference, may be inferred by verifying whether a FEC field of an optical channel transport unit-k (OTUk) comprises all zeros.

Some transparent optical systems and/or hybrid electro-optical systems, such as OEO switches, wavelength converters, and regenerators, may have a plurality of similar properties. Such NEs may be "transparent" to an optical signal depending on their functionality and/or implementation. The regenerators may implement various regeneration schemes, such as discussed in ITU-T G.872 Annex A, which is incorporated herein by reference. Based on their functionalities, the regenerators may correspond to different categories or classes of generators: 1R; 2R; and 3R, as described in Table 1 below.

1R regenerators may be independent of signal modulation format (or line coding), but may operate over a relatively limited range of wavelengths/frequencies. 2R generators may be applied to signal digital streams, dependent upon the modulation format, and limited to some extent to a range of bit rates but not necessarily to a specific bit rate. 3R generators may be applied to signal channels, dependent upon the modulation format, and sensitive to the bit rate of the digital signals. For example, a 3R generator may be designed to handle a specific bit rate or may be programmed to receive and regenerate a specific bit rate.

1R, 2R, and 3R regenerators may not substantially modify the bit stream in the optical or electrical signal. However, the bit stream may be slightly modified for performance monitoring and fault management purposes. Some existing networks, such as Synchronous Optical Networking (SONET), Synchronous Digital Hierarchy (SDH), and ITU-T G.709 based networks, may use a digital signal envelope for the bit stream between 3R regenerators. The digital signal envelop may be referred to as a section signal in SONET, a regenerator section signal in SDH, and OTUk in G.709. A portion of the frame structure in the signals (e.g. overhead) may be reserved for use by the regenerators. The overhead portion is summarized in Table 2.

TABLE 1

Regenerator classes and associated functionality.

| Regenerator Type | Functions |
|---|---|
| 1R | Equal amplification of all frequencies within the amplification bandwidth. There is no restriction upon information formats. Amplification with different gain for frequencies within the amplification bandwidth. This could be applied to both single channel and multi-channel systems. Dispersion compensation (phase distortion). This analogue process can be applied in either single-channel or multi-channel systems. |
| 2R | Any or all 1R functions. Noise suppression. Digital reshaping (Schmitt Trigger function) with no clock recovery. This is applicable to individual channels and can be used for different bit rates but is not transparent to line coding (modulation). |
| 3R | Any or all 1R and 2R functions. Complete regeneration of the pulse shape including clock recovery and retiming within required jitter limits |

Table 2 shows current support for frame alignment, signal identification, and FEC at a WSON layer. However, the GMPLS control plane may not provide switching or multiplexing at the WSON layer to simplify the GMPLS control plane. The GMPLS control plane may provide the management functions in Table 2 in the WSON layer but may require a multi-layer implementation to provide switching functionalities. As such, existing technologies that may support additional management layers may be ignored by the GMPLS control plane, and for example may be implemented instead at a management plane. In an embodiment, the WSON layer of the GMPLS control plane may be configured to support at least some functionality for regenerators and other NEs for switching and/or multiplexing. The additional supported functionality may substitute for using multi-layer or higher layer switching, e.g. at a management layer instead of the control plane layer.

TABLE 2

SONET, SDH, and G.709 regenerator related overhead.

| Function | SONET/SDH Regenerator Section | ITU-T G.709 OTUk |
|---|---|---|
| Signal Identifier | J0 (section trace) | Trail Trace Identifier (TTI) |
| Performance Monitoring | BIP-8 (B1) | BIP-8 (within SM) |
| Management Communications | D1-D3 bytes | GCC0 (general communications channel) |
| Fault Management | A1, A2 framing bytes | frame alignment signal (FAS), backward defect indication (BDI), backward error indication (BEI) |
| FEC | P1, Q1 bytes | OTUk FEC |

Some of the regenerator functionality may be supported at the WSON layer by specifying or indicating a plurality of regenerator compatibility constraints for the different class generators 1R, 2R, and 3R. Table 3 shows a plurality of regenerator compatibility constraints, including limited wavelength range, modulation type restriction, bit rate range restriction, specific or exact bit rate restriction, and client signal dependence. For example, 1R, 2R, and 3R regenerators may have a limited wavelength range, 2R and 3R regenerators may also have a modulation type restriction and a bit rate restriction, and additionally 3R regenerators may have an exact or specific bit rate restriction and a client signal dependence. The limited wavelength range constraint may be modeled in current GMPLS implementation and the modulation type restriction constraint may indicate FEC support.

TABLE 3

Regenerators compatibility constraints.

| Constraints | 1R | 2R | 3R |
|---|---|---|---|
| Limited Wavelength Range | X | X | X |
| Modulation Type Restriction |  | X | X |
| Bit Rate Range Restriction |  | X | X |
| Exact Bit Rate Restriction |  |  | X |
| Client Signal Dependence |  |  | X |

The WSON switches that use or comprise regenerators may also perform OEO processing or switching, such as OEO switches. A vendor may add a regenerator to a switching system for various purposes. For example, the regenerator may restore signal quality either before or after optical processing (e.g. switching). The optical signal may also be converted to an electrical signal for switching and then reconverted to an optical signal prior to egress from the switch. As such, signal regeneration may be applied to adapt the signal to the switch fabric, e.g. regardless of whether regeneration is needed to maintain signal quality. In any such cases, the OEO switches may have substantially similar compatibility constraints as the regenerator compatibility constraints above. Thus, the compatibility constraints above (in Table 3) may be used to support both regenerator and OEO switch functionality in the GMPLS control plane layer.

Wavelength converters may be configured to receive one or more optical channels, e.g. at specific wavelengths, and convert them to corresponding new specific wavelengths. Wavelength converters may not have been widely deployed. For instance, in some current systems, wavelength converters are based on demodulating an incoming optical signal into an electrical signal and re-modulating the electrical signal into a new optical signal, e.g. using OEO processing. Such process may be similar to that of regenerators, except that the output signal wavelength may be different than the input signal wavelength. Therefore, the wavelength converters may have signal processing restrictions substantially similar to regenerators and OEO switches. Thus, the NE compatibility constraints above (in Table 3) may also be used to support wavelength converter functionality in the GMPLS control plane layer. Additionally, the wavelength converter compatibility constraints may comprise an input frequency (or wavelength) range restriction and an output frequency restriction, which may be more restrictive than the supported WDM link range. Such restriction may be modeled as described in draft-ietf-ccamp-gmpls-g-694-lambda-labels-04.txt and draft-ietf-ccamp-rwa-wson-framework-06.txt, both of which are incorporated herein by reference.

The above regenerator compatibility constraints, including the additional wavelength converter compatibility constraints, may be needed to implement path selection and/or RWA implementation. Thus, the regenerator or NE compatibility constraints may be exchanged in the WSON using IGP or GMPLS, for example in the message 502. Additionally, the regenerators, OEO switches, wavelength converters, and/or other NEs may be characterized using a plurality of NE functional constraints, which may also be part of the exchanged RWA information. The additional functional constraints may comprise input constraints, output constraints, and processing capabilities. The input constraints may be associated with a received signal and comprise: (1) acceptable modulation restrictions; (2) client signal (e.g. GPID) restrictions; (3) bit rate restrictions; (4) FEC coding restrictions; and (5) configurability, which may indicate one of (a) none, (b) self-configuring, and (c) required.

The NE may need provisioning to accept signals with some attributes and reject signals with other attributes. For example, the 2R generator may be provisioned to receive only signals that match its bit rate restrictions. Alternatively, some of the NEs may be configured to auto-detect some signal attributes and accordingly configure themselves. For example, the 3R generator may use a detection mechanism and/or a phase locking circuitry to detect the signal's bit rate and adapt accordingly. The configurability functional constraint may be used to characterize the NE's configurability. The input constraints above may be applied to a source NE or a sink NE for the transported signal.

The output constraints may be associated with a transmitted signal from the NE, which may not modify the signal bit rate or the type of the client signal. However, the NE may modify the modulation format of the FEC code of the signal. The output constraints may comprise: (1) output modulation that may be by default the same as the input modulation; (2) a limited set of available output modulations; (3) output FEC that may be the same as the input FEC; and (4) a limited set of available output FEC codes. If there is more than one choice in the output modulation and/or output FEC codes, then the NE may be configured on a per LSP basis for each selected choice.

The processing capabilities may be associated with functionality of the NEs. In an embodiment, the processing capability may specify regeneration capabilities of regenerators, OEO switches, and/or wavelength converters. The processing capabilities may include: (a) regeneration, such as for different regenerator classes; (b) fault and performance monitoring; (c) wavelength conversion; and (d) switching. The wavelength conversion and switching capabilities may be supported in GMPLS and WSON framework. The regeneration capability may indicate whether a NE is or is not capable of performing signal regeneration. Some NEs may have limited regeneration capability for specific signals traversing the NEs, such as in a shared pool of NEs.

The regeneration capability per link or a node may be specified by indicating at least: (1) regeneration capability, which may correspond to one of (a) fixed, (b) selective, and (c) none; (2) regeneration type, such as 1R, 2R, or 3R; and (3) regeneration pool properties for the case of selective regeneration, which may comprise ingress and egress restrictions and availability. The properties of a shared pool of NEs, such as shared generator pools, may be substantially similar to the properties of wavelength converter pools in the draft-ietf-ccamp-rwa-wson-framework-06.txt.

The fault and performance monitoring capability may be handled outside the GMPLS control plane. However, when the NEs' operations are performed on a LSP basis, the control plane may assist in the fault and performance monitoring configuration process. For example, fault and performance monitoring may include setting up a section trace, e.g. in a generator overhead identifier, between two NEs per LSP and/or node. Fault and performance monitoring may also include intermediate optical performance monitoring at selected nodes along a path.

The WSON regenerators, OEO switches, and/or wavelength converters may be used in different networking scenarios, which may include fixed regeneration points, shared regeneration pools, and reconfigurable regenerators. In the case of fixed regeneration points, substantially all signals traversing a link or a node may be regenerated. For example, the fixed regeneration points may comprise OEO switches that provide signal regeneration at their ports. Such regenerator NEs, including any one of regenerators, OEO switches, and wavelength converters, may be subject to input constraints and/or output constraints, such as described above. Such regeneration constraints may be needed to implement path selection and/or RWA implementation.

For instance, the regeneration constraints and/or information may be exchanged in a message, e.g. message 502, between a PCC, PCE, and/or NE using IGP or GMPLS. Additionally, the regeneration constraints may be needed to support impairment aware routing and wavelength assignment (IA-RWA). For example, the path select process may require information regarding which NEs are capable of signal generation to implement the IA-RWA. The regeneration information, such as for wavelength converters, may also be useful in typical RWA to relax the wavelength continuity constraint. The fixed generation points scenario may not require changes to the WSON signaling scheme since reconfigurable regenerator options may not be used for input, output, and processing.

In the case of shared regeneration pools, a plurality of NEs may share a regenerator pool. For example, a plurality of regenerators may be shared within a node in the network and any of the regenerators may be optionally applied to a signal traversing the node. In shared regeneration pools, reconfigurable regenerator options may not be used for input and output but may be needed for processing. In this case, regeneration information may be used for path computation to select a path that ensures compatibility and/or IA-RWA requirements. In an embodiment, to set up a LSP that uses a regenerator in a node associated with a shared regenerator pool, GMPLS signaling may be modified to indicate that regeneration is needed at the node along a signal path.

In the case of reconfigurable regenerators, the NEs may require configuration prior to processing an optical signal. For example, a regenerator may be configured to receive signals with different characteristics, choose an output attribute (e.g. modulation or FEC) from a selection of output attributes, or perform regeneration with additional processing capabilities. As such, information about the regeneration properties of the regenerator may be signaled using GMPLS to select a compatible path using the regenerator and/or for IA-RWA computation. Additionally, during LSP setup, the regeneration properties may be used to configure the regenerator in a node along the path.

Networks that comprise transparent NEs, such as reconfigurable optical add drop multiplexers (ROADMs) and OEO NEs, such as generators or OEO switches may be referred to sometimes as translucent networks. Translucent networks may implement different GMPLS control plane schemes or approaches. The translucent networks may include (1) transparent "islands" that may be surrounded by regenerators, such as when transitioning from a metro optical sub-network to a long haul optical sub-network. The translucent networks may also include (2) mostly transparent networks with a limited quantity of OEO (or "opaque") nodes that may be strategically placed. Such networks may take advantage of inherent regeneration capabilities of OEO switches, and thus an optimal placement of the OEO switches may be determined. Additionally, the translucent networks may include (3) mostly transparent networks with a limited quantity of optical switching nodes with shared regenerator pools, which may be optionally applied to signals that traverse the switches. The switches may be referred to sometimes as translucent nodes. The translucent network types above may use fixed regeneration points and/or shared regeneration pools scenarios, which may be supported by extending GMPLS signaling.

Some NE models have been provided in WSON framework and draft-bernstein-ccamp-wson-g-info-03.txt (both of which are incorporated herein by reference) to include switching asymmetry and port wavelength constraints. In an embodiment, a plurality of NE compatibility parameters may be used for current node/link models to account for the input constraints, output constraints, and signal processing capabilities described above. The parameters may be used for GMPLS routing purposes and may be exchanged via GMPLS signaling. The input constraints parameters may include (1) permitted optical tributary signal classes, such as a list of optical tributary signal classes that may be processed by the NE or carried over a link. For instance, the corresponding input parameter may specify a configuration type that indicates a permitted optical tributary class.

The input constraints parameters may also include (2) acceptable FEC codes, which may be specified by a configuration type. The input constraints parameters may include (3) an acceptable bit rate set, such as a list of specific bit rates or bit rate ranges that the NE may accommodate. For instance, coarse bit rate information may be included with the optical tributary class restrictions. The input constraints parameters may also include (4) acceptable GPID, such as a list of GPIDs that correspond to client digital streams that may be compatible with the NE. Since the bit rate of the signal may not change over a LSP, the bit rate of the signal may be used as a LSP parameter and this information may be available to any NE associated with the LSP, which may use the information for configuration purposes. In this case, the NE associated bit rate configuration type may not be needed.

The output constraint parameters may include: (1) output modulation, which may indicate one of (a) same as input or (b) list of available types; and (2) FEC options, which also correspond to (a) same as input or (b) list of available codes. The processing capabilities parameters may include: (1) regeneration, which may indicate one of (a) 1R, (b) 2R, (c) 3R, and (d) list of selectable regeneration types; and (2) fault and performance monitoring, which may correspond to (a) GPID particular capabilities or (b) optical performance monitoring capabilities. The parameters above may be specified on a (a) network basis, (b) per port basis, or (c) per regenerator or NE basis. Typically, such information may be provided on a per port basis, for example using a GMPLS interface switching capability descriptor as described in RFC 4202, which is incorporated herein by reference. However, wavelength converters in the WSON framework may be used within a switching system or node on a sub-system basis, and thus it may not be efficient to provide such information only on per port basis.

As described above, the WSON signal may be characterized at any point along a path by a modulation format, FEC, wavelength, bit rate, and/or GPID. The GPID, wavelength (or label), and bit rate may be supported in RFC 3471 and RFC 3473 (both of which are incorporated herein by reference), where change in wavelength at the node along a LSP may be accommodated and explicit control to wavelength converters may be provided. In the fixed regeneration points scenario, current GMPLS signaling may be used to provide the WSON signal attributes or characteristics. In the case of shared regeneration pools, the GMPLS may be extended to instruct to a node to perform regeneration on a particular signal or to specify that some nodes along a LSP may perform regeneration. In the case of reconfigurable regenerators, the GMPLS may also be extended to implement regeneration per node or per LSP basis. The WSON signal characteristics may be indicated using a plurality of attributes or parameters, such as LSP attributes in Record Route Objects (RROs) and/or EROs. For example, the techniques specified in RFC 5420, which is incorporated herein by reference, that allow recording LSP attributes in RROs may be extended to allow additional LSP attributes in EROs. As such, the LSP attributes may be used to indicate where optional 3R regeneration may be performed on a path, any modifications to the WSON characteristics such as the modulation format, and/or any processing capability such as performance monitoring.

In one scenario where the PCE and PCC may be in communications, such as during the method 500, the PCC may indicate any of the following information to the PCE: the GPID type of a LSP, the acceptable signal attributes at the transmitter (at the source), and/or the acceptable signal attributes at the receiver (at the sink). The signal attributes at the source and similarly at the sink may include the modulation type and/or the FEC type. The PCC may also indicate the ability to specify if generation is allowed in the computed path. If this ability is allowed, the PCC may also indicate a maximum number of regenerators or regenerator NEs allowed in the computed path. Subsequently, the PCE may respond to the PCC with the information about the conformity of the requested optical characteristics for the resulting LSP with the source, the sink, and any NE along the LSP. The PCE may also respond with additional LSP attributes, which may be modified along the path, such as modulation format changes.

In one scenario where the PCE and PCC may be in communications, such as during the method 500, the PCC may indicate any of the following information to the PCE: the GPID type of an LSP, the signal attributes at the transmitter (at the source), and/or the signal attributes at the receiver (at the sink). The signal attributes at the source and similarly at the sink may include the modulation type and/or the FEC type. Subsequently, the PCE may respond to the PCC with the information about the conformity of the requested optical characteristics associated with the resulting LSP with the source, the sink, and any NE along the LSP. The PCE may also respond with additional LSP attributes, which may be modified along the path, such as modulation format changes, and/or special or specific node processing information associated with the resulting LSP (e.g. a regeneration point).

RFC 4655, which is incorporated herein by reference, defines a PCE based architecture and explains how a PCE may compute a LSP in Multiprotocol Label Switching Traffic Engineering (MPLS-TE) and GMPLS networks at the request of a PCC. The PCC may be any network component that makes such a request, for instance an Optical Switching Element within a WDM network. The PCE may be located anywhere within the network, for example within a NE, a Network Management System (NMS), an Operational Support System (OSS), or may be an independent network server. The PCEP is the communication protocol used between PCC and PCE and, in some embodiments, may also be used between cooperating PCEs. RFC 4657, which is incorporated herein by reference, specifies some common protocol requirements for PCEP.

In an embodiment, the PCEP may be extended to support compatibility constraints, such as based on the signal attributes, the NE compatibility constraints, the NE functional constraints, and/or the NE compatibility parameters described above. As such, path computations in WSONs may support NE processing using specific signal characteristics and attributes. Some signals used in a WSON may not be compatible with some NEs, including regenerators, OEO switches, and/or wavelength converters. Therefore, the PCE may need the compatibility constraints above to compute a constrained path that satisfies signal compatibility and processing constraints. In an embodiment, the compatibility constraints used by the PCE may comprise input compatibility, such as the type of signals the NE can receive (e.g. modulation type, bit rate, and/or FEC type). The compatibility constraints may comprise regeneration capability, such as the types of processing/regeneration the NE can perform (e.g. for 1R, 2R, or 3R), and the types of conversions the NE can perform (e.g. modulation types and/or FEC types). The compatibility constraints may comprise output format, such as the type of signals the NE can transmit (e.g. modulation types, bit rates, and/or FEC types).

In an embodiment, the PCC may send to the PCE a request parameter (RP) object that indicates the compatibility constraints, e.g. in a request message (message 502). The RP object may comprise a signal compatibility check (SC) bit that may be set (e.g. to about one) to request from the PCE to support signal compatibility and processing constraints. The RP object may comprise a plurality of TLVs or sub-TLVs, such as a modulation type list TLV, a FEC type list TLV, and/or GPID type TLV. The PCE may also send a reply message to the PCC to specify compatibility information associated with the computed path. The compatibility information may be sent in an object in the reply message, which may comprise a plurality of TLVs, such as a modulation type TLV, a FEC type TLV, and/or a regeneration point TLV.

Figure 6:
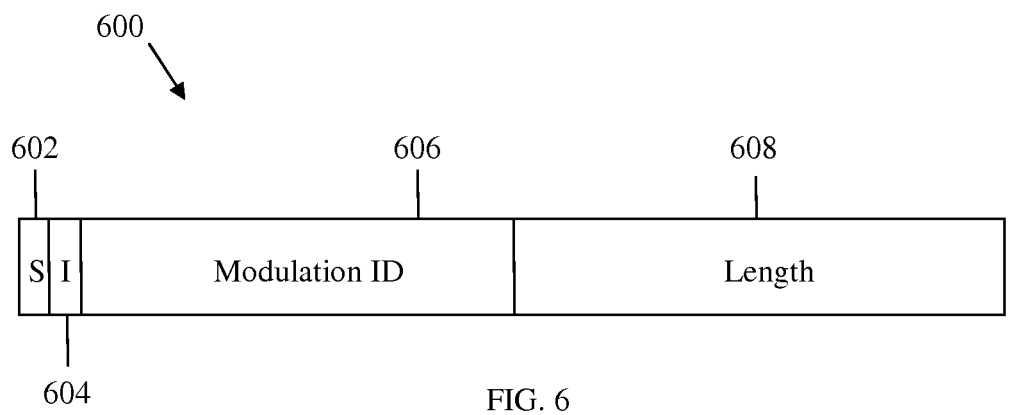
FIG. 6 is a schematic diagram of an embodiment of a modulation type list header.

FIG. 6 illustrates one embodiment of a modulation type list header 600 for a modulation type list TLV that may be forwarded from the PCC to the PCE. The modulation type list header 600 may comprise a standardized modulation (S) bit 602, an input modulation format (I) bit 604, a modulation identifier (ID) 606, and a length field 608. In an embodiment, the modulation type list header 600 may have a size of about 32 bits. The S bit 602 may be set, e.g. to about one, to indicate a standardized modulation format or may be set, e.g. comprise about zero, to indicate a vendor specific modulation format. The I bit 604 may be set, e.g. to about one, to indicate an input modulation format and/or a sink modulation type or may not be set, e.g. to about zero, to indicate an output modulation format and/or a source modulation type. The modulation ID 606 may comprise a unique ID associated with one modulation format/type. The length field 608 may indicate the entire size of the modulation type list TLV.

Figure 7:
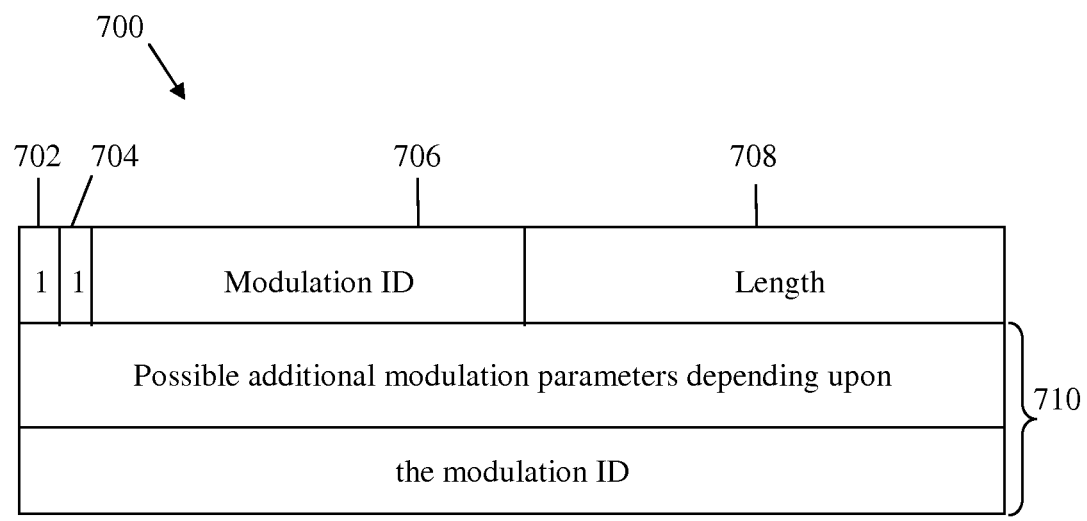
FIG. 7 is a schematic diagram of an embodiment of a modulation type list Type-Length-Value (TLV).

FIG. 7 illustrates one embodiment of a modulation type list TLV 700, which may include the modulation type list header 600. The modulation type list TLV 700 may be sent in a RP object, for instance if the SC bit in the RP object is set. The modulation type list TLV 700 may comprise an S bit 702, an I bit 704, a modulation ID 706, and a length field 708, which may be similar to the corresponding fields in modulation type list header 600. The modulation type list TLV 700 may also comprise at least one field 710 than includes additional modulation parameters based on the modulation ID. Specifically, the modulation type list TLV 700 may correspond to a standardized modulation format. As such, the S bit 702 may be set, e.g. to about one. The modulation ID 706 may comprise a value of about one to indicate an optical tributary signal class NRZ 1.25G, a value of about two to indicate an optical tributary signal class NRZ 2.5G, a value of about three to indicate an optical tributary signal class NRZ 10G, a value of about four to indicate an optical tributary signal class NRZ 40G, or a value of about one to indicate an optical tributary signal class RZ 40G. Alternatively, the modulation ID 706 may comprise a reserved value of about zero. The field 710 may indicate allowable modulation types in the source (transmitter) and/or the sink (receiver).

Figure 8:
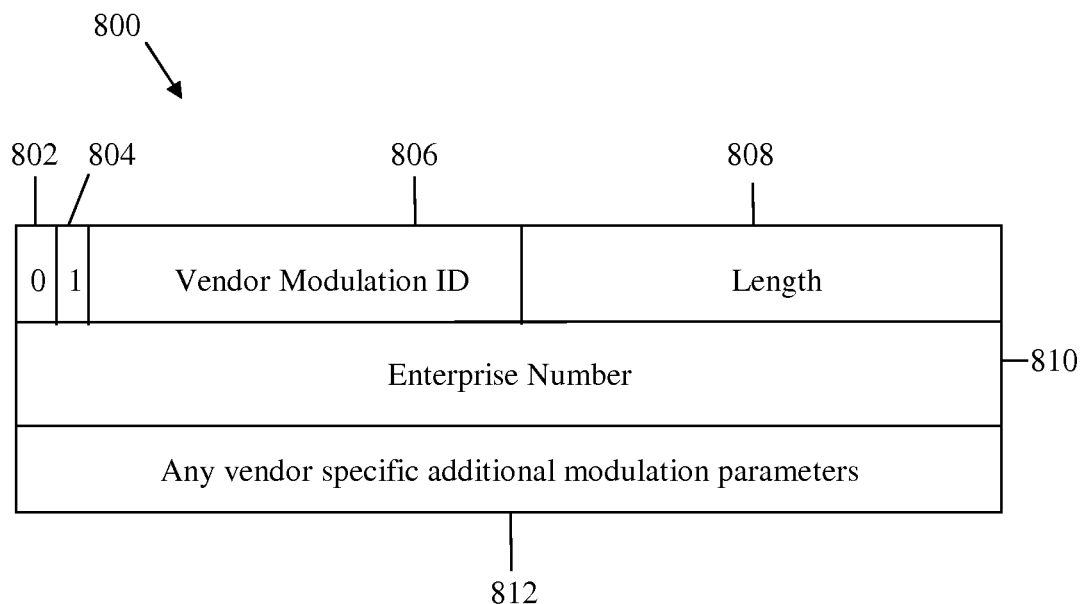
FIG. 8 is a schematic diagram of another embodiment of a modulation type list TLV.

FIG. 8 illustrates another embodiment of a modulation type list TLV 800, which may include the modulation type list header 600. The modulation type list TLV 800 may be sent in a RP object, for instance if the SC bit in the RP object is set. The modulation type list TLV 800 may comprise an S bit 802, an I bit 804, and a length field 808, which may be similar to the corresponding fields in modulation type list header 600. The modulation type list TLV 800 may also comprise a vendor modulation ID 806, an enterprise number 810, and at least one field 812 that includes vendor specific additional modulation parameters. Specifically, the modulation type list TLV 800 may correspond to vendor specific modulation format. As such, the S bit 802 may be set, e.g. to about zero. The vendor modulation ID 806 may comprise an assigned ID for the modulation type, e.g. for a vendor. The enterprise number 810 may comprise a unique identifier of an organization and may comprise about 32 bits. The enterprise numbers may be assigned by the Internet Assigned Numbers Authority (IANA) and managed through IANA registry, e.g. according to RFC 2578. The field 812 may comprise additional parameters that characterize vendor specific modulation.

Figure 9:
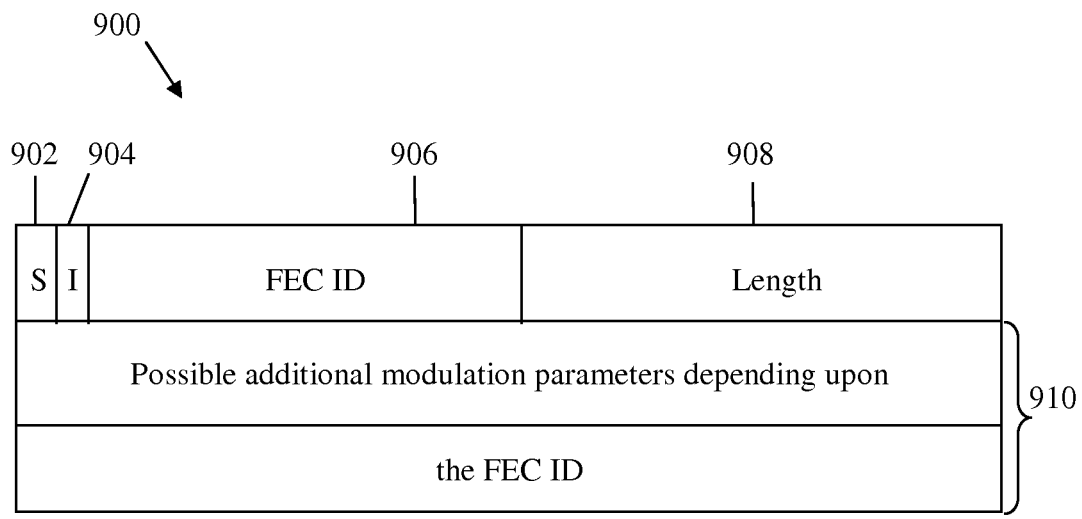
FIG. 9 is a schematic diagram of an embodiment of a Forward Error Correction (FEC) type list TLV.

FIG. 9 illustrates one embodiment of a FEC type list TLV 900 that may be forwarded from the PCC to the PCE. The FEC type list TLV 900 may be sent in a RP object, for instance if the SC bit in the RP object is set. The FEC type list TLV 900 may comprise an S bit 902, an I bit 904, a FEC ID 906, a length field 908, and at least one field 910 that includes FEC parameters based on the FEC ID. The S bit 902 may be set, e.g. to about one, to indicate a standardized FEC format or may be set, e.g. comprise about zero, to indicate a vendor specific FEC format. The I bit 904 may be set, e.g. to about one, to indicate an input FEC format and/or a sink FEC type or may not be set, e.g. to about zero, to indicate an output FEC format and/or a source FEC type. The FEC ID 906 may comprise a unique ID associated with one FEC format/type. The length field 908 may indicate the entire size of the FEC type list TLV.

Figure 10:
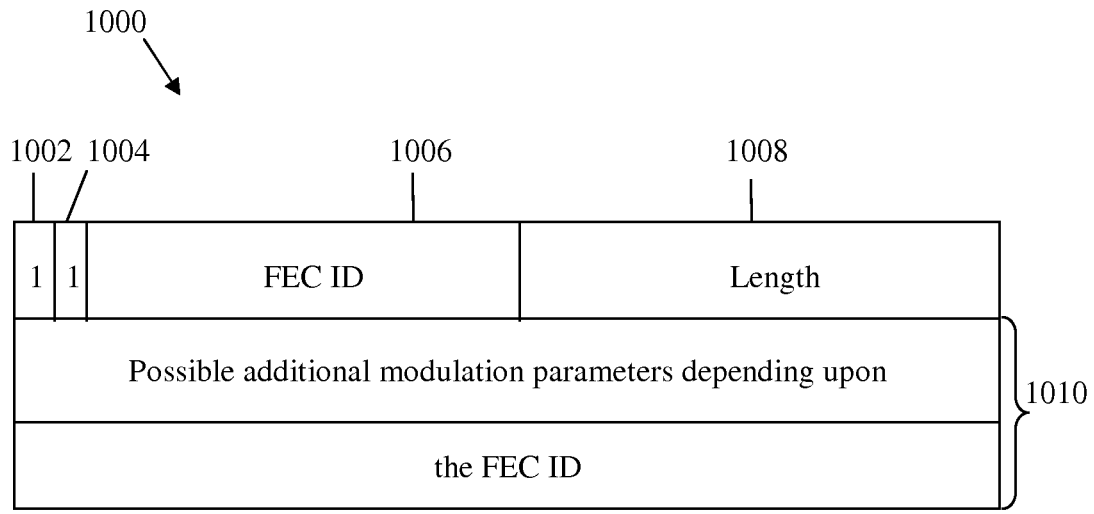
FIG. 10 is a schematic diagram of another embodiment of a FEC type list TLV.

FIG. 10 illustrates another embodiment of a FEC type list TLV 1000 that may be forwarded from the PCC to the PCE. The FEC type list TLV 1000 may comprise an S bit 1002, an I bit 1004, and a length field 1008, which may be similar to the corresponding components of the FEC type list TLV 900. The FEC type list TLV 1000 may also comprise a FEC ID 1006 and at least one field 1010. Specifically, the FEC type list header 1000 may correspond to a standardized FEC format. As such, the S bit 1002 may be set, e.g. to about one. The FEC ID 1006 may comprise a value of about one to indicate an ITU-T G.709 Reed-Solomon FEC or a value of about two to indicate an ITU-T G.907V compliant Ultra FEC. The FEC 1006 may comprise a value of about three to indicate an ITU-T G.975.1 Concatenated FEC (RS(255,239)/CSOC(n0/k0=7/6,j=8)), a value of about four to indicate a G.975.1 Concatenated FEC (Bose-Chaudhuri-Hocquengham or BCH (3860,3824)/BCH(2040,1930)), a value of about five to indicate a G.975.1 Concatenated FEC (RS(1023,1007)/BCH (2407,1952)), or a value of about six to indicate a G.975.1 Concatenated FEC (RS(1901,1855)/Extended Hamming Product Code (512,502)×(510,500)). The FEC 1006 may comprise a value of about seven to indicate a G.975.1 low density parity check (LDPC) Code, a value of about eight to indicate a G.975.1 Concatenated FEC (Two orthogonally concatenated BCH codes), a value of about nine to indicate a G.975.1 RS(2720,2550), or a value of about 10 to indicate a G.975.1 Concatenated FEC (Two interleaved extended BCH (1020,988) codes). The standards G.709V and G.975.1 are both incorporated herein by reference. Alternatively, the FEC ID 1006 may comprise a reserved value of about zero. The field 1010 may indicate allowable FEC types in the source (transmitter) and/or the sink (receiver).

Figure 11:
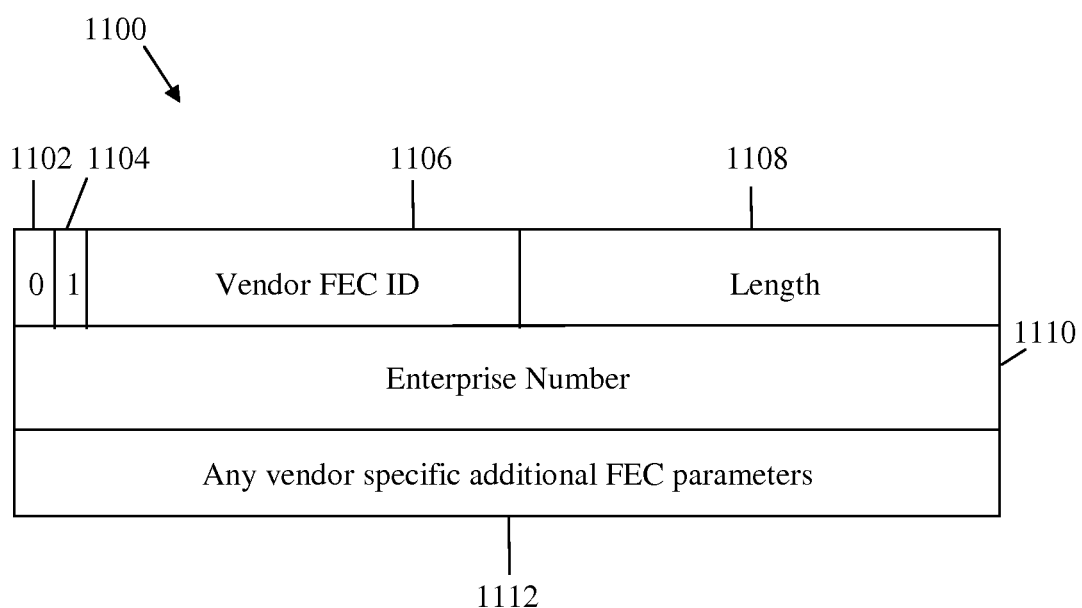
FIG. 11 is a schematic diagram of another embodiment of a FEC type list TLV.

FIG. 11 illustrates another embodiment of a FEC type list TLV 1100 that may be forwarded from the PCC to the PCE. The FEC type list TLV 1100 may comprise an S bit 1102, an I bit 1104, and a length field 1108, which may be similar to the corresponding components of the FEC type list TLV 900. The FEC type list TLV 1100 may also comprise a vendor FEC ID 1106, an enterprise number 1110, and at least one field 1112 that includes vendor specific additional FEC parameters. Specifically, the FEC type list TLV 1100 may correspond to vendor specific FEC format. As such, the S bit 1102 may be set, e.g. to about zero. The vendor FEC ID 1106 may comprise a vendor assigned ID for the FEC type. The enterprise number 1110 may comprise a unique identifier of an organization and may comprise about 32 bits. The enterprise numbers may be assigned by IANA and managed through IANA registry, e.g. according to RFC 2578. The field 1112 may comprise additional parameters that characterize vendor specific FEC.

Figure 12:
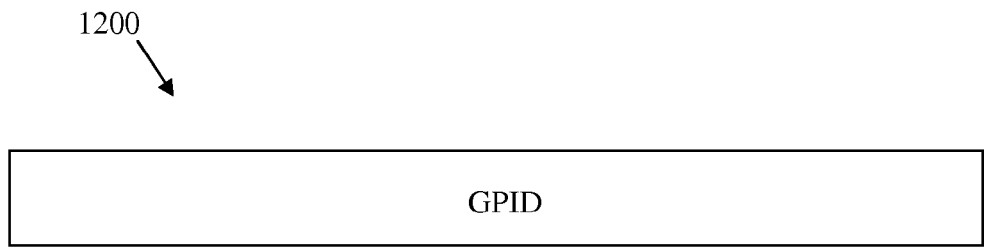
FIG. 12 is a schematic diagram of an embodiment of a General Protocol Identifier (GPID) type TLV.

FIG. 12 illustrates one embodiment of a GPID type list TLV 1200 that may be forwarded from the PCC to the PCE. The GPID type list TLV 1200 may be sent in a RP object, for instance if the SC bit in the RP object is set. The GPID type list TLV 1200 may comprise a GPID that may be assigned by IANA, such as one of the GPIDs specified in RFC 3471 and RFC 4328.

Figure 13:
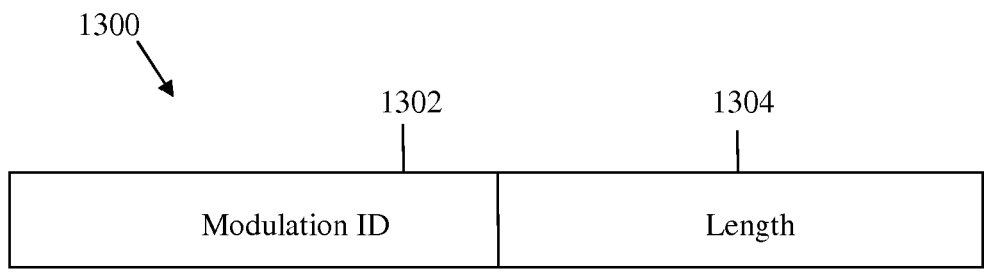
FIG. 13 is a schematic diagram of an embodiment of a modulation type TLV.

FIG. 13 illustrates one embodiment of a modulation type TLV 1300 that may be forwarded from the PCE to the PCC. The modulation type TLV 1300 may be sent in reply to a RP object from the PCC, for instance if the SC bit in the RP object is set. The modulation type TLV 1300 may comprise a modulation ID 1302 and a length field 1304. The modulation ID 1302 may comprise a unique ID associated with the computed path from the PCE, which may be the same ID sent in the modulation ID 706 or the vendor modulation ID 806. The length field 1302 may indicate the length of the modulation type TLV 1300, which may be equal to about 32 bits.

Figure 14:
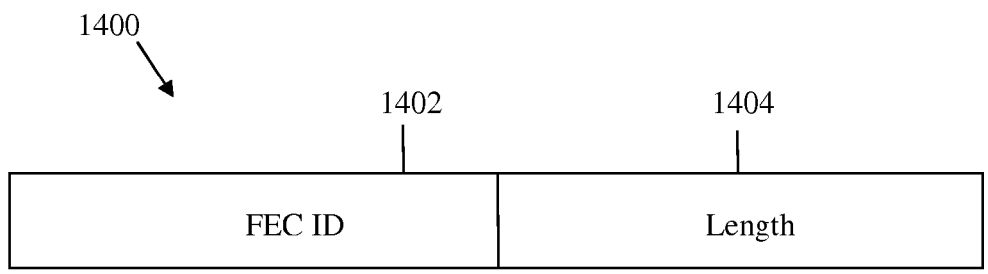
FIG. 14 is a schematic diagram of an embodiment of a FEC type TLV.

FIG. 14 illustrates one embodiment of a FEC type TLV 1400 that may be forwarded from the PCE to the PCC. The FEC type TLV 1400 may be sent in reply to a RP object from the PCC, for instance if the SC bit in the RP object is set. The FEC type TLV 1400 may comprise a FEC ID 1402 and a length field 1404. The FEC ID 1402 may comprise a unique ID associated with the computed path from the PCE, which may be the same ID sent in the FEC ID 1006 or the vendor FEC ID 1106. The length field 1402 may indicate the length of the FEC type TLV 1400, which may be equal to about 32 bits.

Figure 15:
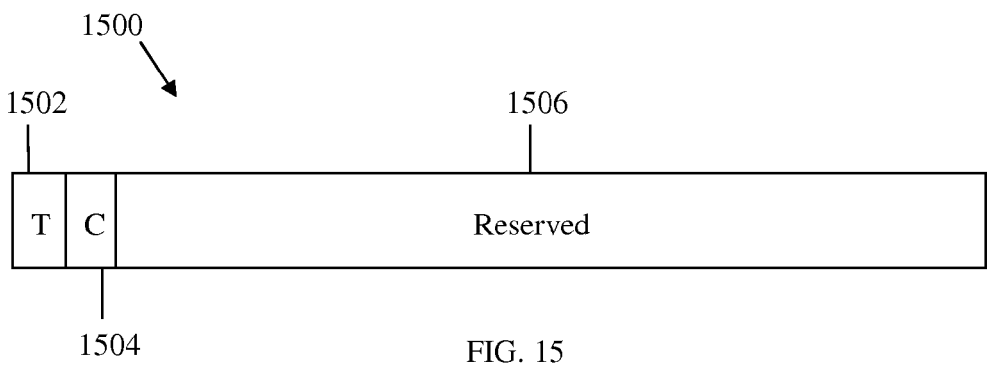
FIG. 15 is a schematic diagram of an embodiment of a regeneration point TLV.

FIG. 15 illustrates one embodiment of a regeneration point TLV 1500 that may be forwarded from the PCE to the PCC. The regeneration point TLV 1500 may be sent in reply to a RP object from the PCC, for instance if the SC bit in the RP object is set. The regeneration point TLV 1500 may comprise a generator type (T) bit 1502, a generator capability (C) bit 1504, and a reserved field 1506. The T bit 1502 may indicate a regenerator type. The T bit 1502 may comprise a value of about one to indicate a 1R regenerator, a value of about two to indicate a 2R regenerator, and a value of about three to indicate a 3R regenerator. Alternatively, the T bit 1502 may comprise a reserved value of about zero. The C bit 1504 may indicate a generator capability. The C bit 1504 may comprise a value of about one to indicate a fixed regeneration point and a value of about two to indicate a selective regeneration pools. When selective generation pools are indicated, regeneration pool properties, such as input and output constraints and availability, may be specified, e.g. in another TLV from the PCE. Alternatively, the C bit 1504 may comprise a reserved value of about zero. The reserved field 1506 may be reserved and may not be used.

Figure 16:
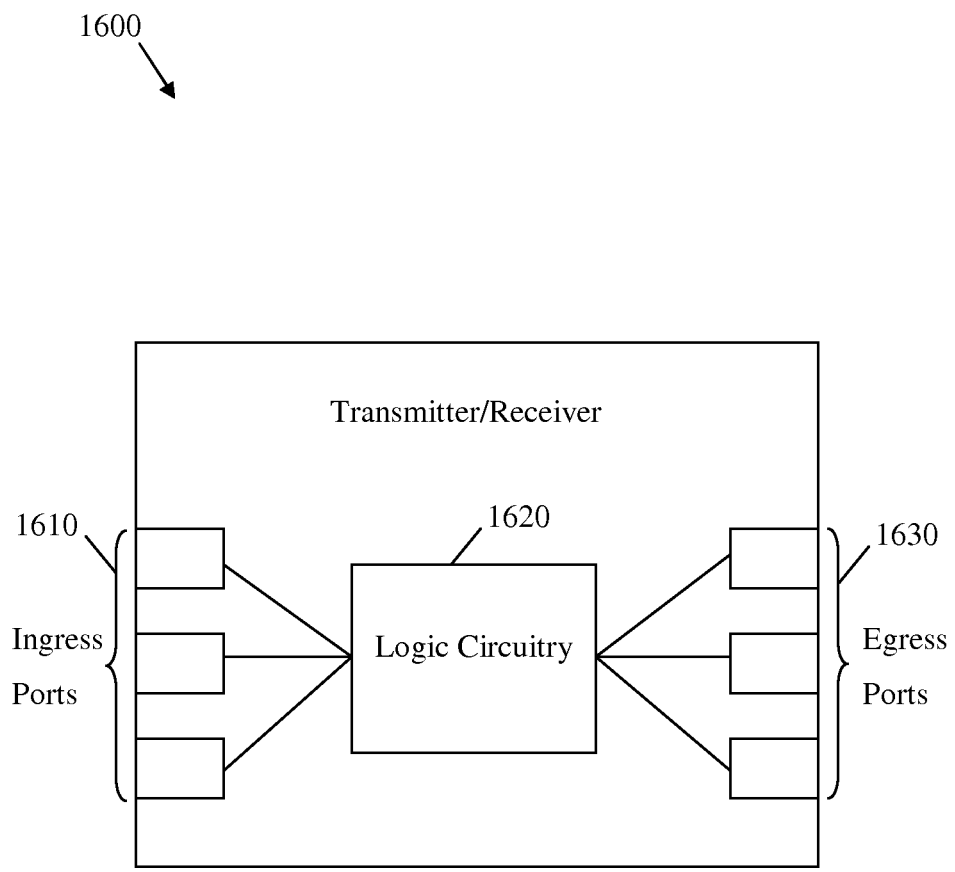
FIG. 16 is a schematic diagram of an embodiment of a transmitter/receiver unit.

FIG. 16 illustrates an embodiment of a transmitter/receiver unit 1600, which may be located at or coupled to any of the NEs in the WSON. The transmitter/receiver unit 1600 may be any device that transports frames through the WSON. For instance, the transmitter/receiver unit 1600 may correspond to or may be located in a network node, such as regenerators, OEO switches, wavelength converters, OXCs, PXCs, type I or type II ROADMs, WSSs, FOADMs, or combinations thereof. The node may include bridges, switches, routers, or various combinations of such devices. The transmitted/receiver unit 1600 may comprise a plurality of ingress ports or units 1610 for receiving frames, objects, or TLVs from other nodes, logic circuitry 1620 to determine which nodes to send the frames to, and a plurality of egress ports or units 1630 for transmitting frames to the other nodes.

Figure 17:
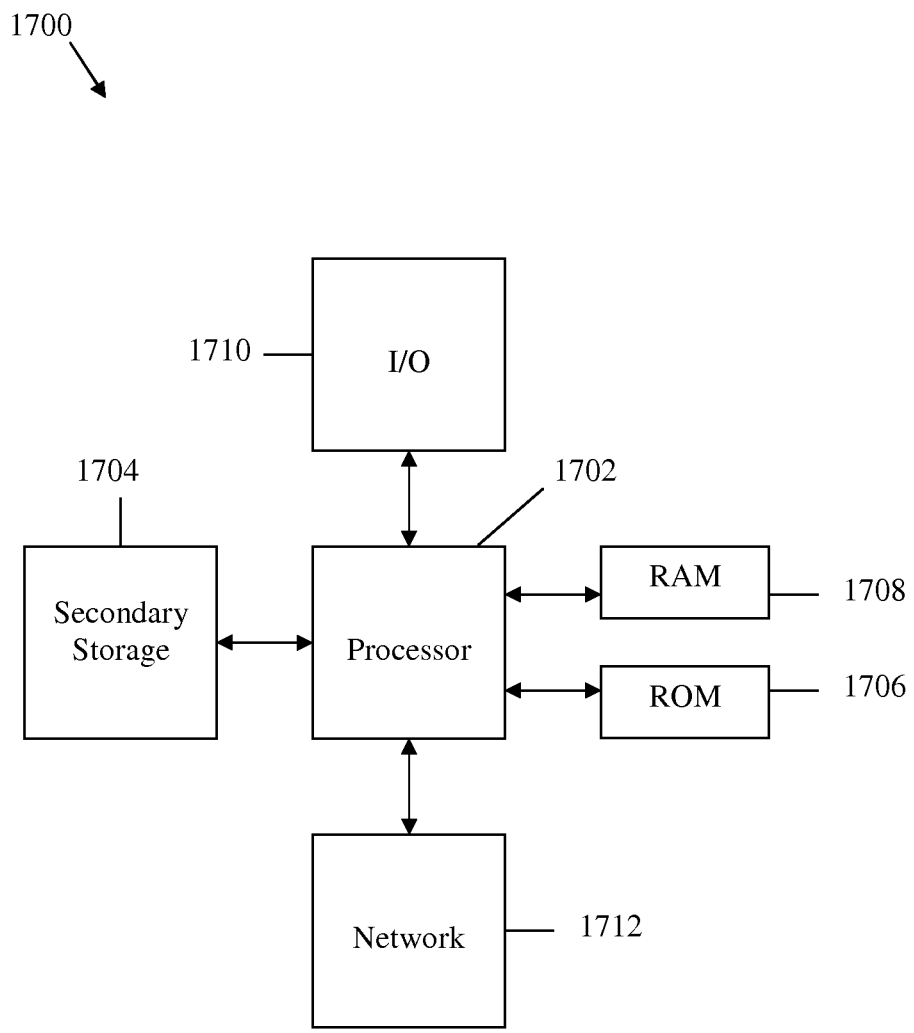
FIG. 17 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 17 illustrates a typical, general-purpose network component 1700 suitable for implementing one or more embodiments of the components disclosed herein. The network component 1700 includes a processor 1702 (which may be referred to as a central processor unit or CPU) that is in communication with memory devices including secondary storage 1704, read only memory (ROM) 1706, random access memory (RAM) 1708, input/output (I/O) devices 1710, and network connectivity devices 1712. The processor 1702 may be implemented as one or more CPU chips, or may be part of one or more application specific integrated circuits (ASICs).

The secondary storage 1704 is typically comprised of one or more disk drives or tape drives and is used for non-volatile storage of data and as an over-flow data storage device if RAM 1708 is not large enough to hold all working data. Secondary storage 1704 may be used to store programs that are loaded into RAM 1708 when such programs are selected for execution. The ROM 1706 is used to store instructions and perhaps data that are read during program execution. ROM 1706 is a non-volatile memory device that typically has a small memory capacity relative to the larger memory capacity of secondary storage. The RAM 1708 is used to store volatile data and perhaps to store instructions. Access to both ROM 1706 and RAM 1708 is typically faster than to secondary storage 1704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a path computation element (PCE) configured to perform a path computation using signal compatibility constraints information for a network element (NE) in a wavelength switched optical network (WSON),
wherein the signal constraints information are communicated at a Generalized Multi-Protocol Label Switching (GMPLS) control plane layer and comprise a plurality of signal attributes and a plurality of NE compatibility constraints,
wherein the NE compatibility constraints comprise a plurality of NE functional constraints including a plurality of input constraints, a plurality of output constraints, and a plurality of processing capabilities, and
wherein the input constraints are associated with a signal received at the NE and comprise an acceptable modulation format, a client signal or General Protocol Identifier (GPID) restriction, a bit rate restriction, a Forward Error Correction (FEC) coding restriction, and a configurability, wherein the configurability indicates one of no configurability, self configurability, and required configurability.

2. The apparatus of claim 1, wherein the signal attributes comprise optical tributary signal class or modulation format, a Forward Error Correction (FEC) type or format, a center frequency or wavelength, a bit rate, and a General Protocol Identifier (GPID) for the information format.

3. The apparatus of claim 1, wherein the output constraints are associated with a signal transmitted from the NE and comprise indications that an output modulation is the same as an input modulation, a limited set of output modulations is available, an output Forward Error Correction (FEC) is the same as an input FEC, and a set of available output FEC codes is available.

4. The apparatus of claim 1, wherein the processing capabilities specify regeneration capabilities and comprise indications as to whether the NE can perform a regeneration function, a fault and performance monitoring function, a wavelength conversion function, and a switching function.

5. The apparatus of claim 4, wherein regeneration capabilities per link or per node are specified by indicating regeneration capability that corresponds to one of fixed regeneration, selective regeneration, and no regeneration, a regeneration type that corresponds to one of 1R, 2R, and 3R, and a regeneration pool properties for selective regeneration that comprise ingress and egress restrictions and availability.

6. An apparatus comprising:
a path computation element (PCE) configured to perform a path computation using signal compatibility constraints information for a network element (NE) in a wavelength switched optical network (WSON), wherein the signal constraints information are communicated at a Generalized Multi-Protocol Label Switching (GMPLS) control plane layer and comprise a plurality of signal attributes and a plurality of NE compatibility constraints, wherein the NE compatibility constraints correspond to a wavelength converter and further comprise input frequency or wavelength range restriction and output frequency or range restriction, and wherein the NE compatibility constraints comprise a limited wavelength range, a modulation type restriction, a bit rate range restriction, an exact bit range restriction, and a client signal dependence.

7. The apparatus of claim 6, wherein the NE compatibility constraints correspond to at least one of a regenerator, an optical-electrical-optical (OEO) switch, and a wavelength converter.

8. A method comprising:
receiving signal compatibility constraints for a network element (NE) in a wavelength switched optical network (WSON);
computing a path based on the signal compatibility constraints for the NE; and
transmitting signal compatibility constraints associated with the computed path,
wherein the signal compatibility constraints information is received in a request parameter (RP) object that comprises a signal compatibility check (SC) bit, wherein the bit is set to request path computation based on signal compatibility and processing constraints,
wherein the transmitted signal compatibility constraints associated with the computed path are sent in an object that comprises a modulation type Type-Length-Value (TLV), a Forward Error Correction (FEC) type TLV, a regeneration point TLV, or combinations thereof, and
wherein the modulation type TLV indicates a modulation type and format associated the computed path, the FEC TLV indicates a FEC type and format associated with the computed path, and the regeneration point TLV indicates a regenerator type and capability associated with the computed path.

9. The method of claim 8, wherein the received signal compatibility constraints are used to implement routing and wavelength assignment (RWA) along the path, wherein the RWA is compatible with the signal compatibility constraints.

10. The method of claim 8, wherein the transmitted signal compatibility constraints are signaled in Generalized Multi-Protocol Label Switching (GMPLS) using an explicit route object (ERO) or other mechanism that specifies a capability or reconfigurability of the path node.

11. The method of claim 8, wherein the received signal compatibility constraints comprise a General Protocol Identifier (GPID) type for a requested Label Switched Path (LSP), signal attributes at a source node, and signal attributes at a sink node.

12. The method of claim 8, wherein the computed path is a Label Switched Path (LSP), and wherein transmitted signal compatibility constraints comprise information about conformity of requested optical characteristics associated with a source node or a sink node of the computed LSP, LSP attributes, and specific node processing information associated with the computed LSP.

13. The method of claim 8, wherein the RP object further comprises a modulation type list Type-Length-Value (TLV), a Forward Error Correction (FEC) type list TLV, a General Protocol Identifier (GPID) type TLV, or combinations thereof.

14. The method of claim 8, wherein the regeneration point TLV comprises a type (T) bit, wherein the T bit indicates a regenerator type of the path node, wherein the T bit is set to a value of about one to indicate a first class (1R) regenerator, a value of about two to indicate a second class (2R) regenerator, and a value of about three to indicate a third class (3R) regenerator.

15. The method of claim 8, wherein the regeneration point TLV comprises a capability (C) bit, wherein the C bit indicates the path node capability, wherein the C bit is set to a value of about one to indicate a fixed regeneration point and a value of about two to indicate selective regeneration pools.

* * * * *

UNITED STATES PATENT AND TRADEMARK OFFICE
CERTIFICATE OF CORRECTION

PATENT NO. : 8,467,681 B2
APPLICATION NO. : 12/898778
DATED : June 18, 2013
INVENTOR(S) : Young Lee and Greg Bernstein Page 1 of 1

It is certified that error appears in the above-identified patent and that said Letters Patent is hereby corrected as shown below:

In the Claims:

Column 21, Lines 28 and 36, claim 8 should read, "A method comprising: receiving signal compatibility constraints for a network element (NE) in a wavelength switched optical network (WSON); computing a path based on the signal compatibility constraints for the NE; and transmitting signal compatibility constraints associated with the computed path, wherein the signal compatibility constraints information is received in a request parameter (RP) object that comprises a signal compatibility check (SC) bit, wherein the SC bit is set to request path computation based on signal compatibility and processing constraints, wherein the transmitted signal compatibility constraints associated with the computed path are sent in an object that comprises a modulation type Type-Length-Value (TLV), a Forward Error Correction (FEC) type TLV, a regeneration point TLV, or combinations thereof, and wherein the modulation type TLV indicates a modulation type and format associated with the computed path, the FEC TLV indicates a FEC type and format associated with the computed path, and the regeneration point TLV indicates a regenerator type and capability associated with the computed path."

Signed and Sealed this
Thirteenth Day of August, 2013

Teresa Stanek Rea
*Acting Director of the United States Patent and Trademark Office*